US009239389B2

(12) United States Patent
Jeong et al.

(10) Patent No.: US 9,239,389 B2
(45) Date of Patent: Jan. 19, 2016

(54) OBSTACLE SENSOR AND ROBOT CLEANER HAVING THE SAME

(75) Inventors: Yeon Kyu Jeong, Suwon-si (KR); Shin Kim, Hwaseong-si (KR); Jeong Hun Kim, Hwaseong-si (KR); Jong Owan Kim, Hwaseong-si (KR); Sang Sik Yoon, Suwon-si (KR); Dong Hun Lee, Ansan-si (KR); Jea Yun So, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 455 days.

(21) Appl. No.: 13/616,137

(22) Filed: Sep. 14, 2012

(65) Prior Publication Data

US 2013/0076893 A1    Mar. 28, 2013

(30) Foreign Application Priority Data

Sep. 28, 2011 (KR) .......................... 10-2011-0098191
May 11, 2012 (KR) .......................... 10-2012-0050312

(51) Int. Cl.
*G02B 17/08* (2006.01)
*G01S 17/00* (2006.01)
(Continued)

(52) U.S. Cl.
CPC .............. *G01S 17/00* (2013.01); *G01S 7/4813* (2013.01); *G01S 7/4814* (2013.01); *G01S 7/4816* (2013.01); *G01S 17/88* (2013.01); *G01S 17/936* (2013.01);
(Continued)

(58) Field of Classification Search
CPC . G05D 1/0238; G05D 1/0257; G05D 1/0289; G05D 2201/0215; G01B 11/14; A47L 11/4061; A47L 2201/04

USPC .......................................... 348/36, 37, 38, 39
See application file for complete search history.

(56) References Cited

U.S. PATENT DOCUMENTS 3,780,295 A * 12/1973 Kapron et al. ................... 385/31
4,898,470 A *  2/1990 Cleaveland .................... 356/513
(Continued)

FOREIGN PATENT DOCUMENTS

JP            10-9853         1/1998
JP         2002-162062        6/2000
(Continued)

OTHER PUBLICATIONS

Radu Orghidan, "Catadioptric Stereo Based on Structured Light Projection",PhD Thesis presented on Dec. 2005.*
Lin S S and Bajcsy R, "Single-View-Point Omnidirectional Catadioptric Cone Mirror Imager", May 1, 2006, IEEE Transactions on Pattern Analysis and Machine Intelligence.*
(Continued)

*Primary Examiner* — Sath V Perungavoor
*Assistant Examiner* — Clifford Hilaire
(74) *Attorney, Agent, or Firm* — Staas & Halsey LLP

(57) ABSTRACT

An obstacle sensor includes a line light irradiating unit including a light-emitting unit, a light-emitting driving unit to drive the light-emitting unit, and a first conical mirror, an apex of which is disposed towards the light-emitting unit in a light irradiation direction of the light-emitting unit and which converts light emitted from the light-emitting unit into line light irradiated in all directions, and a reflected light receiving unit including a second conical mirror to condense light, that is irradiated from the first conical mirror and is then reflected from an obstacle, a lens, that is spaced from the apex of the second conical mirror by a predetermined distance and transmits the reflected light, an imaging unit to image the reflected light that passes through the lens, an image processing unit, and an obstacle sensing control unit.

25 Claims, 25 Drawing Sheets

(51) Int. Cl.
  G05D 1/02 (2006.01)
  G01S 17/88 (2006.01)
  G01S 17/93 (2006.01)
  G01S 7/481 (2006.01)

(52) U.S. Cl.
  CPC .......... G02B 17/0808 (2013.01); G05D 1/0248 (2013.01); *G05D 2201/0203* (2013.01)

(56) References Cited

U.S. PATENT DOCUMENTS

| | | | |
|---|---|---|---|
| 5,710,950 A * | 1/1998 | Hozumi | 396/263 |
| 7,742,070 B2 * | 6/2010 | Glatt | 348/36 |
| 7,817,260 B2 * | 10/2010 | Chuang et al. | 356/237.1 |
| 7,920,337 B2 * | 4/2011 | Perchak | 359/709 |
| 2004/0204792 A1 * | 10/2004 | Taylor et al. | 700/245 |
| 2007/0061043 A1 * | 3/2007 | Ermakov et al. | 700/263 |
| 2011/0153081 A1 * | 6/2011 | Romanov et al. | 700/255 |

FOREIGN PATENT DOCUMENTS

| | | |
|---|---|---|
| KR | 10-0214888 | 8/1999 |
| KR | 10-0647321 | 11/2006 |
| KR | 10-2009-0048104 | 5/2009 |

OTHER PUBLICATIONS

Yasushi Yagi and Masahiko Yachida, "Real-time Generation of Environmental Map and Obstacle Avoidance using omnidirectional Image Sensor with Conic Mirror", 1991, CH2983-5/91/0000/016 IEEE, p. 160-165.*

MIT 2.71/2.710 ; Feb. 23, 2009 wk4-a-1; "Overview: composite optical elements"; <http://ocw.mit.edu/courses/mechanical-engineering/2-71-optics-spring-2009/video-lectures/lecture-6-terms-apertures-stops-pupils-and-windows-single-lens-camera/MIT2_71S09_lec06.pdf>.*

Radu Orghidan "Catadioptric Stereo Based on Structured Light Projection".*

Ruzena Bajcsy [Single-view-point omnidirectional catadioptric cone mirror imager].*

Yasushi Yagi [Real-time Generation of Environmental Map and Obstacle Avoidance using omnidirectional Image Sensor with Conic Mirror].*

Radu, Orghidan. Catadioptric stereo based on structured light projection. Universitat de Girona, 2006.*

Yagi, Yasushi, and Masahiko Yachida. "Real-time generation of environmental map and obstacle avoidance using omnidirectional image sensor with conic mirror." Computer Vision and Pattern Recognition, 1991. Proceedings CVPR'91., IEEE Computer Society Conference on. IEEE, 1991.*

* cited by examiner

OBSTACLE SENSOR AND ROBOT CLEANER HAVING THE SAME

CROSS-REFERENCE TO RELATED APPLICATIONS

This application claims the benefit of Korean Patent Application Nos. 2011-0098191 and 2012-0050312, filed on Sep. 28, 2011 and May 11, 2012, respectively, in the Korean Intellectual Property Office, the disclosures of which are incorporated herein by reference.

BACKGROUND

1. Field

Embodiments of the present disclosure relate to an obstacle sensor capable of sensing obstacles in all directions and a robot cleaner including the same.

2. Description of the Related Art

In general, an obstacle sensor irradiates light, ultrasonic waves and the like, senses light or ultrasonic waves reflected from obstacles, judges presence of obstacles and the distance thereof based on time difference, phase difference and intensity difference of the sensed signals or judges the distance using a reflected angle.

Recently, a method for measuring the distance between a sensor and an obstacle using point light source or structural light such as line light has been developed. However, use of a point light source causes a problem in that only an obstacle present in the direction of a beam radiated from the point light source is detected. When a point light source sensor is rotated in order to solve this problem, a separate servomechanism and some degree of scanning time are required, thus disadvantageously causing deterioration in efficiency.

In a case of using a line light, obstacles present throughout a plurality of regions, not in one point, can be simultaneously detected, but there are problems such as limited detection range and difficulty of formation of uniform line light when a line light is formed using a cylindrical lens of the related art.

SUMMARY

Therefore, it is an aspect of the present disclosure to provide an obstacle sensor capable of sensing obstacles in all directions by forming uniform line light using a conical mirror and a robot cleaner including the same.

Additional aspects and/or advantages will be set forth in part in the description which follows and, in part, will be apparent from the description, or may be learned by practice of the disclosure.

In accordance with one aspect of the present disclosure, provided is an obstacle sensor including: a line light irradiating unit including: a light-emitting unit; and a first conical mirror, an apex of which is disposed towards the light-emitting unit in a light irradiation direction of the light-emitting unit and which converts light emitted from the light-emitting unit into line light irradiated in all directions; and a reflected light receiving unit including: a second conical mirror to condense light, that is irradiated from the first conical mirror and is then reflected from an obstacle; a lens, that is spaced from the apex of the second conical mirror by a predetermined distance and transmits the reflected light; and an imaging unit to image the reflected light that passes through the lens.

The line light irradiating unit may further include: a slit or an axicon lens disposed between the light-emitting unit and the first conical mirror to form light irradiated from the light-emitting unit in the form of a ring.

The line light irradiating unit may further include: a slit having at least one groove disposed between the light-emitting unit and the first conical mirror.

The slit may have a groove having a ring, cross (+), circular or linear (−) shape.

The first conical mirror may be formed by joining two or more conical fragments having different bottom diameters.

The obstacle sensor may further include: a rotator to rotate the first conical mirror.

An angle of two sides formed on the apex on the vertical cross-section of the first conical mirror may be about 88 degrees to about 90 degrees.

The lens of the reflected light receiving unit may be spaced from the apex of the second conical mirror by a focal distance of the lens.

The surface of lens or the second conical mirror of the reflected light receiving unit may be coated with a band pass filter to transmit only wavelength of the reflected light.

The apex of the first conical mirror of the line light irradiating unit and the apex of the second conical mirror of the reflected light receiving unit may be disposed in opposite directions.

The apex of the first conical mirror of the line light irradiating unit and the apex of the second conical mirror of the reflected light receiving unit may be disposed in one direction.

The apex of the first conical mirror of the line light irradiating unit and the apex of the second conical mirror of the reflected light receiving unit may face each other.

The obstacle sensor may further include: a structure having a hole smaller than an irradiation cross-section area of light irradiated from the light-emitting unit, wherein the hole is disposed between the light-emitting unit and the first conical mirror in a light irradiation path of the light-emitting unit.

The line light irradiating unit or the light-emitting unit may be inclined at a predetermined angle from a perpendicular line that is vertical to the ground.

The obstacle sensor may further include: an obstacle sensing control unit to analyze an image recorded on the imaging unit and thereby extract the distance or shape of the obstacle.

The line light irradiating unit may be provided in plural at different heights from the ground and the obstacle sensing control unit may analyze an image recorded on the imaging unit and thereby determine a height of the obstacle.

The lens of the reflected light receiving unit may be a wide-angle lens.

In accordance with another aspect of the present disclosure, provided is a robot cleaner including an obstacle sensor to sense obstacles and a driving control unit to control driving based on the sensing results of the obstacle sensor, wherein the obstacle sensor includes: a line light irradiating unit including: a light-emitting unit; a light-emitting driving unit to drive the light-emitting unit; and a first conical mirror, an apex of which is disposed towards the light-emitting unit in a light irradiation direction of the light-emitting unit and which converts light emitted from the light-emitting unit into line light irradiated in all directions; and a reflected light receiving unit including: a second conical mirror to condense light, that is irradiated from the first conical mirror and is then reflected from an obstacle; a lens, that is spaced from the apex of the second conical mirror by a predetermined distance and transmits the reflected light; an imaging unit to image the reflected light that passes through the lens; and an image processing unit to process the image obtained in the imaging unit; and an obstacle sensing control unit to analyze the image recorded in the imaging unit and thereby extract the distance or shape of the obstacle.

The apex of the first conical mirror of the line light irradiating unit and the apex of the second conical mirror of the reflected light receiving unit may be disposed in the opposite directions.

The line light irradiating unit may be mounted on the bottom of the front surface of the robot cleaner and the reflected light receiving unit may be mounted on the top of the front surface of the robot cleaner.

The driving control unit may receive a shape or distance of the obstacle from the obstacle sensor and determine a travel path based on the shape or distance of the obstacle.

The line light irradiating unit may be provided in plural at different heights from the ground and the obstacle sensing control unit may analyze an image recorded on the imaging unit and thereby determine a height of the obstacle.

The obstacle sensing control unit may transmit a control signal to the light-emitting driving unit to turn the light-emitting unit off when the obstacle sensing control unit determines that the robot cleaner is lift from the ground.

The obstacle sensing control unit may transmit a control signal to the light-emitting driving unit to turn the light-emitting unit off when the obstacle sensing control unit determines that a sensor window of the robot cleaner is detached.

The robot cleaner may further include: a switch or a photo-interrupter adjacent to the sensor window, wherein the obstacle sensing control unit analyzes a signal output from the switch or the photo interrupter and thereby determines detachment of the sensor window.

The obstacle sensing control unit may turn the light-emitting unit on, when the robot cleaner begins to travel, and may turn the light-emitting unit off, when the robot cleaner finishes travel.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
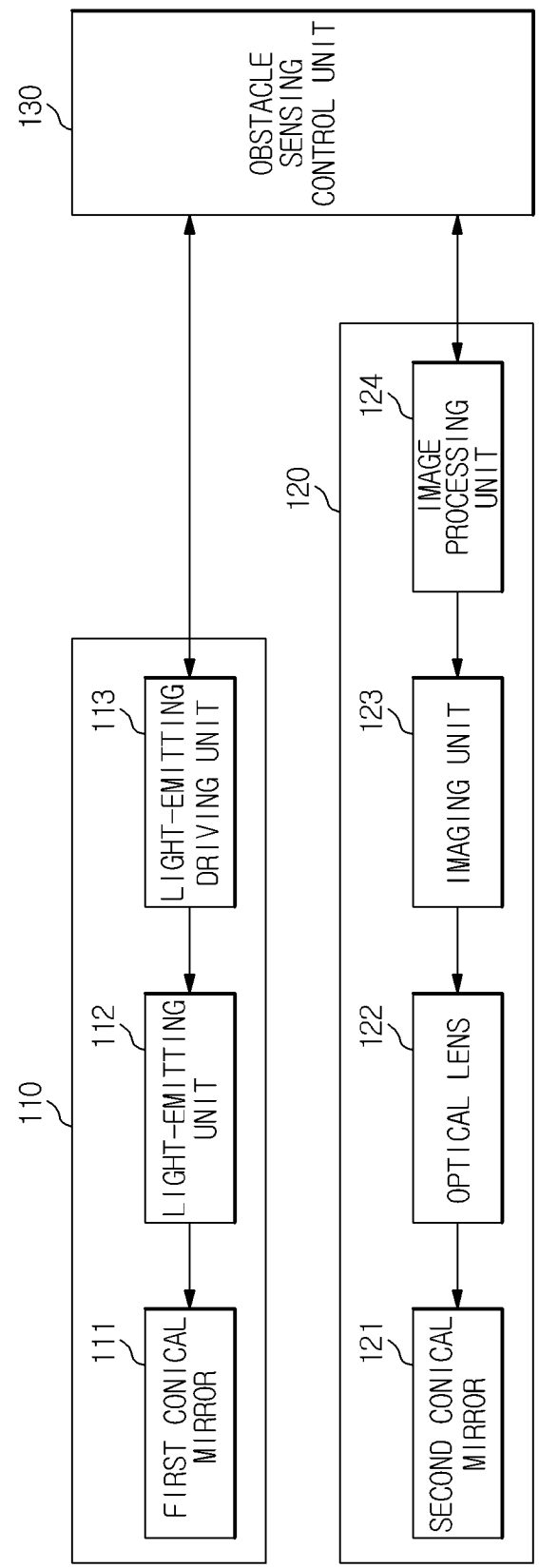
FIG. 1 is a block diagram illustrating a controlled configuration of an obstacle sensor according to one embodiment of the present disclosure.

Reference will now be made in detail to the embodiments of the present disclosure, examples of which are illustrated in the accompanying drawings, wherein like reference numerals refer to like elements throughout.

Hereinafter, embodiments of the present disclosure will be described with reference to the annexed drawings in detail.

FIG. 1 is a block diagram illustrating a controlled configuration of an obstacle sensor according to one embodiment of the present disclosure.

Referring to FIG. 1, the obstacle sensor according to one embodiment of the present disclosure includes a line light irradiating unit 110 including a light-emitting unit 112, a light-emitting driving unit 113 to drive the light-emitting unit 112, and a first conical mirror 111, an apex of which is disposed towards the light-emitting unit 112 in a light irradiation direction of the light-emitting unit 112 and which converts light emitted from the light-emitting unit 112 into line light irradiated in all directions; and a reflected light receiving unit 120 including a second conical mirror 121 to condense a light, that is irradiated from the first conical mirror 111 and is then reflected from an obstacle, a lens 122, that is spaced from the apex of the second conical mirror 121 by a predetermined distance and transmits the reflected light, an imaging unit 123 to image the reflected light that passes through the lens 122 and an image processing unit 124 to process the image obtained in the imaging unit 123; and an obstacle sensing control unit 130 to analyze the image recorded in the imaging unit and thereby extract the distance or the shape of the obstacle.

The light-emitting unit 112 is a light source that emits and irradiates light and may be a laser diode (LD), LED or the like. The type of light-emitting unit 112 is not limited, but a laser diode will be described for convenience of illustration in the following embodiments. The wavelength and amount of light emitted from the laser diode 112 are controlled by the light-emitting driving unit and the wavelength of laser may be an infrared ray region that is invisible to the naked eye or a visible light region. The region of used wavelength is not limited.

The light-emitting driving unit 113 drives the light-emitting unit 112 according to the control signal of the obstacle sensing control unit 130 and feeds back the intensity of irradiated light to an obstacle sensing control unit 130 using a photo-detector or the like.

The first conical mirror 111 enables light irradiated from the light-emitting unit 112 to be reflected from the surface of the first conical mirror 111 to produce line light that emits at 360 degrees in all directions.

The second conical mirror 121 condenses light, that is reflected from the first conical mirror 111, collides with the obstacle and returns back, to the lens 122 and the lens 122 disposed in front of the apex of the second conical mirror 121 forms an image produced by the reflected light on the imaging unit 123.

The imaging unit 123 converts an image produced by the light, that is reflected from an imaged target, passes through the lens 122 and contacts the imaging unit 123, into the intensity of an electric signal depending on the intensity of light, transforms the same into a digital signal and records the same. In the embodiment of the present disclosure, a charge-coupled device (CCD) image sensor, a complementary meta-oxide-semiconductor (CMOS) image sensor or the like may be used, although a CMOS image sensor is used in the following embodiments.

The light, that is irradiated from the line light irradiating unit 110 and reflected from the obstacle, passes through the second conical mirror 121 and the lens 122 and forms an image on the CMOS image sensor 123, and the digital signal converted via the CMOS image sensor 123 is subjected to image processing via the image processing unit 124 and is then transmitted to the obstacle sensing control unit 130.

The line light irradiating unit 110 and the reflected light receiving unit 120 constitute an optical module of the obstacle sensor 100.

The obstacle sensing control unit 130 analyzes the image-processed image and extracts the distance between the obstacle sensor and the obstacle, and the shape or position of the obstacle.

Also, the obstacle sensing control unit 130 modulates frequency, duty ratio and intensity based on the intensity of feedback laser, transmits a control signal to the light-emitting driving unit and thereby enables a user to irradiate a laser having a desired intensity.

The obstacle sensing control unit 130 is not necessarily one module in which the line light irradiating unit 110 is physically joined to the reflected light receiving unit 120 and other apparatus to which the obstacle sensor 100 is mounted, for example, a control unit such as a central processing unit (CPU) or microcontroller (MCU) provided on a movable robot, robot cleaner or the like may be used as the obstacle sensing control unit 130. The configuration of the obstacle sensing control unit 130 is not limited so long as the obstacle sensing control unit 130 is capable of controlling the line light irradiating unit 110 and analyzing information obtained from the reflected light receiving unit 120.

Figure 2:
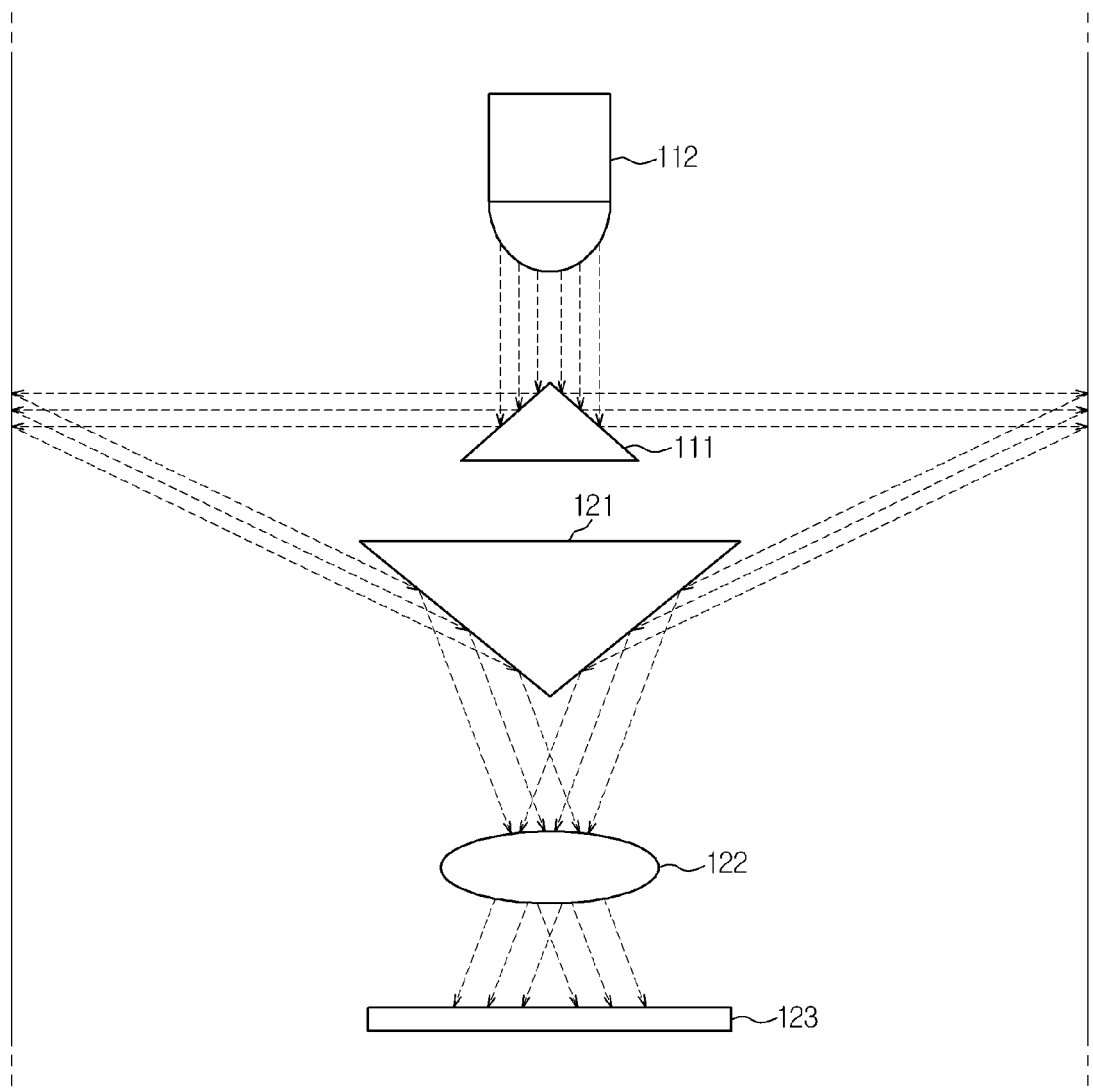
FIG. 2 is a side view schematically illustrating configurations of a line light irradiating unit and a reflected light receiving unit of the obstacle sensor according to one embodiment of the present disclosure.

FIG. 2 is a side view schematically illustrating configurations of a line light irradiating unit and a reflected light receiving unit of an obstacle sensor according to one embodiment of the present disclosure.

Hereinafter, the operation of the obstacle sensor according to one embodiment of the present disclosure will be described with reference to FIG. 2 in detail.

As shown in FIG. 2, the obstacle sensor of the present embodiment has a structure in which the apex of the first conical mirror 111 and the apex of the second conical mirror 121 are in the opposite directions. The positions of the line light irradiating unit 110 and the reflected light receiving unit 120 may be switched.

First, the configuration and operation of the line light irradiating unit 110 will be described. The first conical mirror 111 is disposed in an irradiation direction of the laser diode 112. When the apex of the first conical mirror 111 is directed toward the laser diode 112, the laser irradiated from the laser diode 112 collides with and is reflected from the surface of the first conical mirror 111 to produce line light that is irradiated at 360 degrees in all directions.

At this time, a collimator lens (not shown) is disposed between the laser diode 112 and the first conical mirror 111 and can convert laser irradiated from the laser diode 112 into point light. The laser diode 112 provided with a collimator lens may be used or a laser may be directly reflected from the surface of the conical mirror without using a collimator lens.

Next, a configuration of the reflected light receiving unit 120 will be described. The second conical mirror 121 is disposed such that the apex thereof is toward the bottom and the lens 122 is disposed under the apex of the second conical mirror 121 and the CMOS image sensor 123 is disposed under the lens 122.

When the laser, that is irradiated from the line light irradiating unit 110 and is reflected from the obstacle, collides with the surface of the second conical mirror 121, is condensed on the lens 122 and passes through the lens 122, forms an image on the CMOS image sensor 123, the CMOS image sensor 123 converts the laser into a digital signal and records the same. At this time, a band pass filter to transmit only wavelength of the irradiated laser may be coated on the surface of the lens 122 or the surface of the second conical mirror 121 to remove other signals.

Preferably, the lens 112 is disposed on the apex of the second conical mirror 121 so that an image can be accurately formed on the CMOS image sensor 123. However, when such a disposition is physically difficult, the lens 122 may be spaced from the apex of the second conical mirror 121 by a focal distance of the lens 122.

The lens 122 means an optical lens and the kind thereof is not limited. When a wide-angle lens having a shorter focal distance than a general lens is used, the distance between the second conical mirror 121 and the lens 122 is shortened and the size of an obstacle sensor can thus be reduced. For example, the focal distance of the wide-angle lens may be 50 mm or below.

Figure 3A:
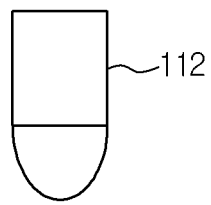
FIGS. 3A, 3B, 3C and 3D are side views illustrating schematic configurations of an obstacle sensor further including a slit interposed between the laser diode and the first conical mirror according to one embodiment of the present disclosure.
Figure 3A:
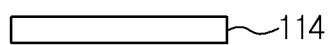
Figure 3A:
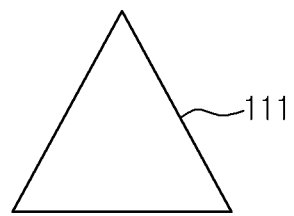
Figure 3A:
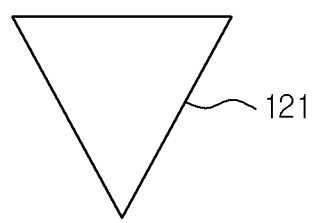
Figure 3A:
Figure 3A:
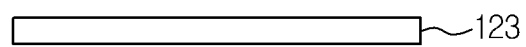

FIG. 3A is a side view illustrating a schematic configuration of an obstacle sensor further including a slit between the laser diode and the first conical mirror according to one embodiment.

Referring to FIG. 3A, the obstacle sensor 100 according to one embodiment of the present disclosure may further include a slit 114 having a groove with a predetermined shape, disposed between the laser diode 112 and the first conical mirror 111 of the line light irradiating unit 110. The slit 114 disposed between the laser diode 112 and the first conical mirror 111 converts a laser beam irradiated from the laser diode 112 into a variety of shapes according to the shape of the groove and transmits the same to the first conical mirror 111.

Figure 3B:
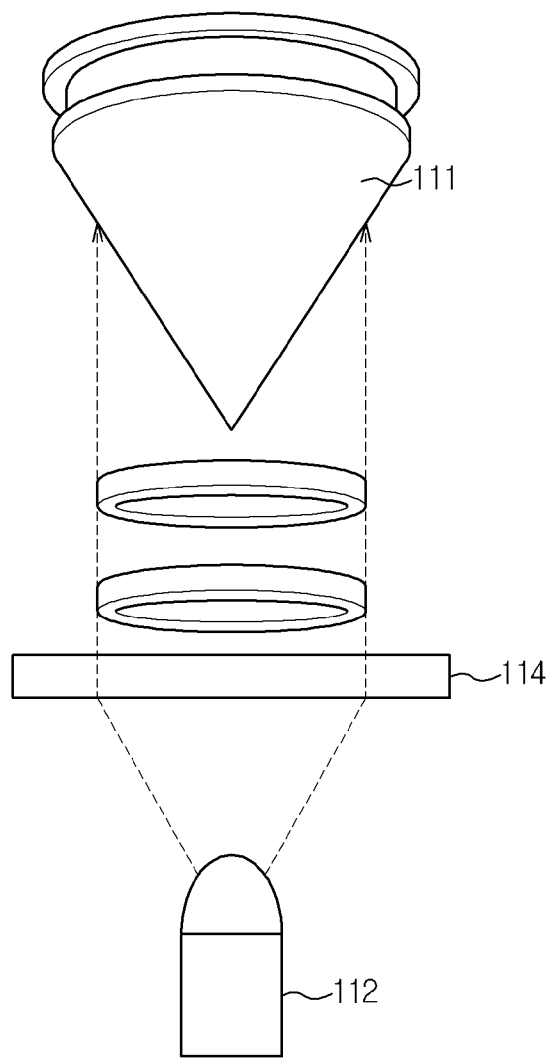

As shown in FIG. 3B, when the slit 114 has a ring or donut-shaped groove, the slit 114 converts a laser beam irradiated from the laser diode 112 into a donut or ring-shape and the donut or ring-shaped laser beam is incident upon the surface of the first conical mirror 111 to produce uniform line light. Although a slit is used to convert laser beam into the donut or ring shape in the present embodiment, an axicon lens may be used instead of the slit.

Meanwhile, when a plurality of grooves having ring shapes with different sizes are formed in the slit 114, line light can be irradiated to a plurality of different heights.

Figure 3C:
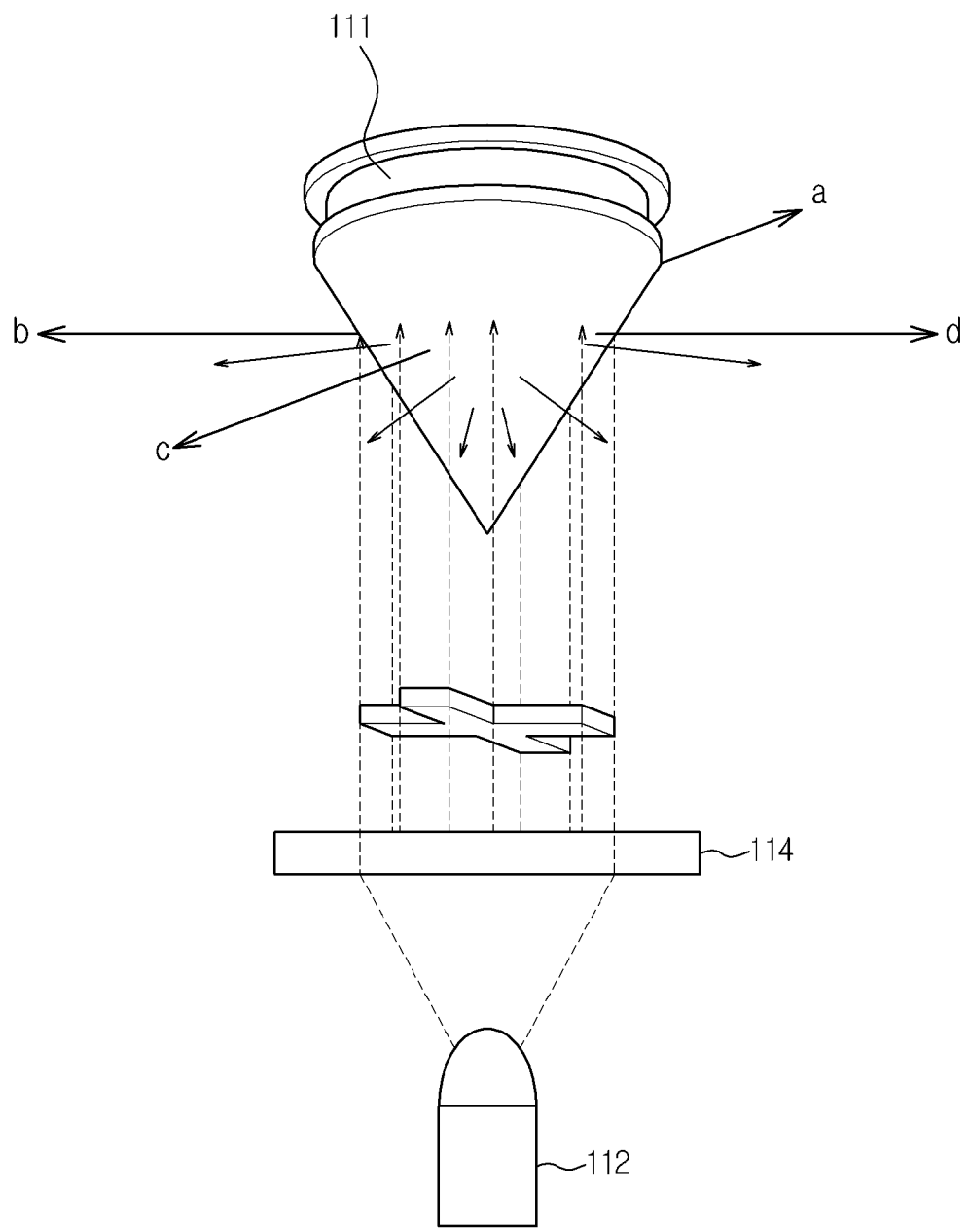

As shown in FIG. 3C, when a groove having a cross (+) shape is formed in the slit 114, the slit 114 converts a laser beam irradiated from the laser diode 112 into the cross (+) shape. The cross-shaped laser beam is incident upon the first conical mirror 111 to produce all directions of line light and the intensity of light in a specific direction is stronger than that of the light in other directions. Specifically, the cross-shaped laser beam is reflected from the surface of the first conical mirror 111, and the intensity of light in directions a, b, c and d becomes stronger than the intensity of light in other directions. Here, the directions a, b, c and d are arbitrary directions that form a right angle with each other.

Although formation of uniform line light may be advantageous in sensing obstacles, the intensity of light may often be changed depending on the direction. In this case, as shown in FIG. 3C, a slit 114 having a cross (+)-shaped groove may be used and the number of strokes may be controlled as desired and used.

Figure 3D:
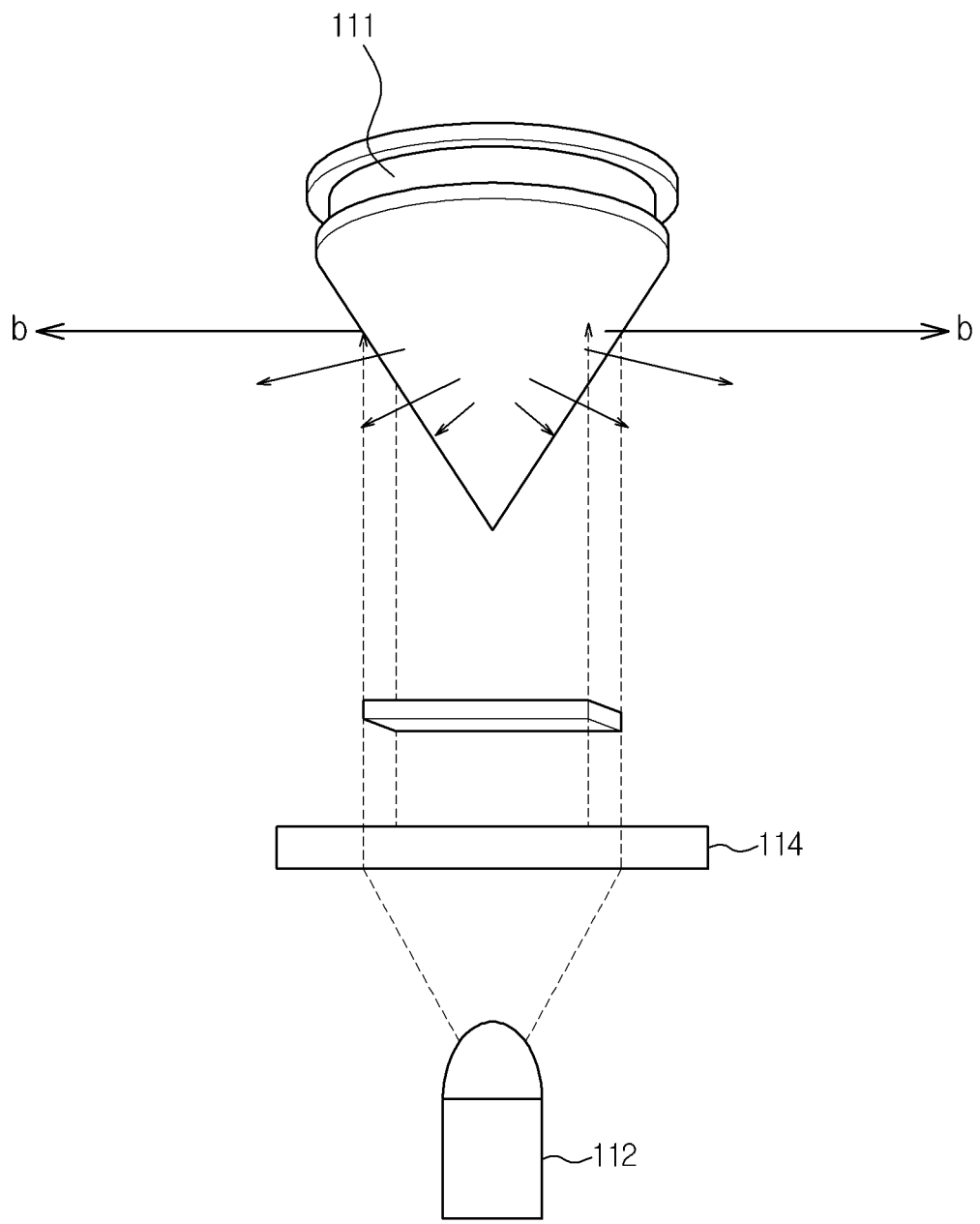

As shown in FIG. 3D, when a slit 114 having a line (−)-shaped groove that is formed by removing one stroke from the cross (+)-shape is used, line light is produced in all directions and the intensity of light in directions d and b becomes stronger than that of the light in other directions.

The shapes of laser beams shown in FIGS. 3B to 3D are provided only for illustration and uniform line light or line light having a concentrated intensity in a specific direction can be provided by emitting other shapes of laser beams to the first conical mirror 111 as desired through variation of the shape of the groove formed in the slit 114.

Generally, when light irradiated from the light-emitting unit 112 is directly incident upon the first conical mirror 111, the produced line light has a uniform thickness. Depending on the application of the obstacle sensor 100, sharp line light or thin line light should be produced in some cases. In this case, the embodiment shown in FIGS. 4A and 4B may be used.

Figure 4A:
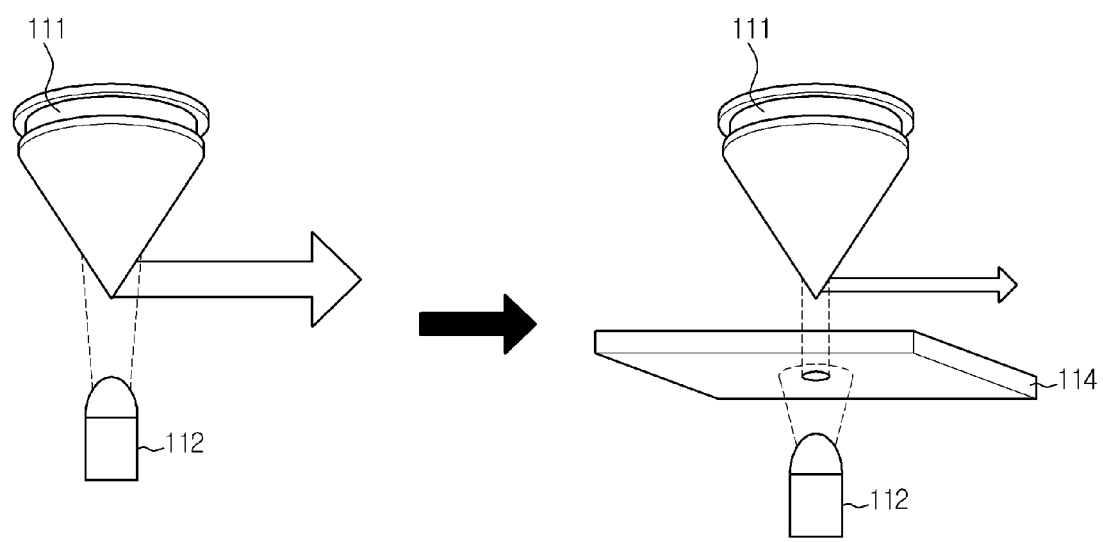
FIGS. 4A and 4B are sectional views illustrating a slit and a structure in which the thickness of line light can be controlled by reducing a diffusion angle of light.
Figure 4B:
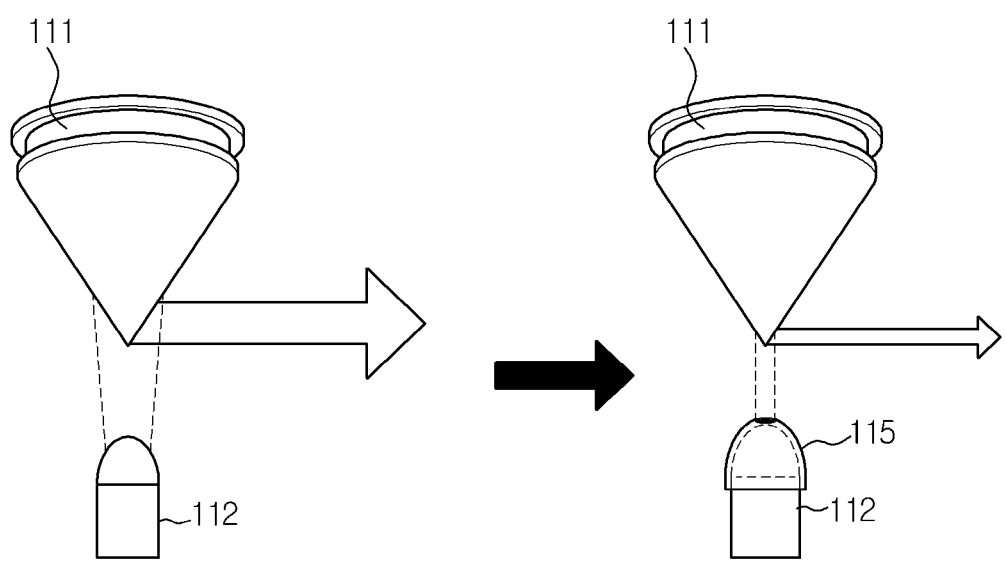

FIGS. 4A and 4B are sectional views illustrating a slit and a structure in which the thickness of line light can be controlled by reducing a diffusion angle of light.

Referring to FIG. 4A, when a slit 114 having a small hole is disposed between the light-emitting unit 112 and the first conical mirror 111, light irradiated from the light-emitting unit 112 passes through the slit 114, the diffusion angle thereof is decreased and light having a decreased diffusion angle is emitted to the first conical mirror 111 to produce thin line light.

Referring to FIG. 4B, when the light-emitting unit 112 is covered with a cap structure 115 provided on the ceiling thereof with a small hole, similar to that shown in FIG. 4A above, the light irradiated from the light-emitting unit 112 passes through the hole provided in the structure 115 and the diffusion angle thereof is decreased and light having a decreased diffusion angle is emitted to the first conical mirror 111 to produce thin line light.

The base of the small hole described in FIGS. 4A and 4B is an irradiation area of light irradiated from the light-emitting unit 112 and the irradiated light should pass through a hole smaller than the irradiation area in order to decrease a diffusion angle of light. By controlling the size of the hole provided in the slit 114 and the structure 115, the diffusion angle can be controlled and line light with a desired thickness can be produced.

In the obstacle sensor according to one embodiment of the present disclosure, an obstacle sense range is determined by an angle (hereinafter, referred to as an angle of apex) formed by two sides in the vertical cross-section between the first conical mirror 111 and the second conical mirror 121.

Figure 5:
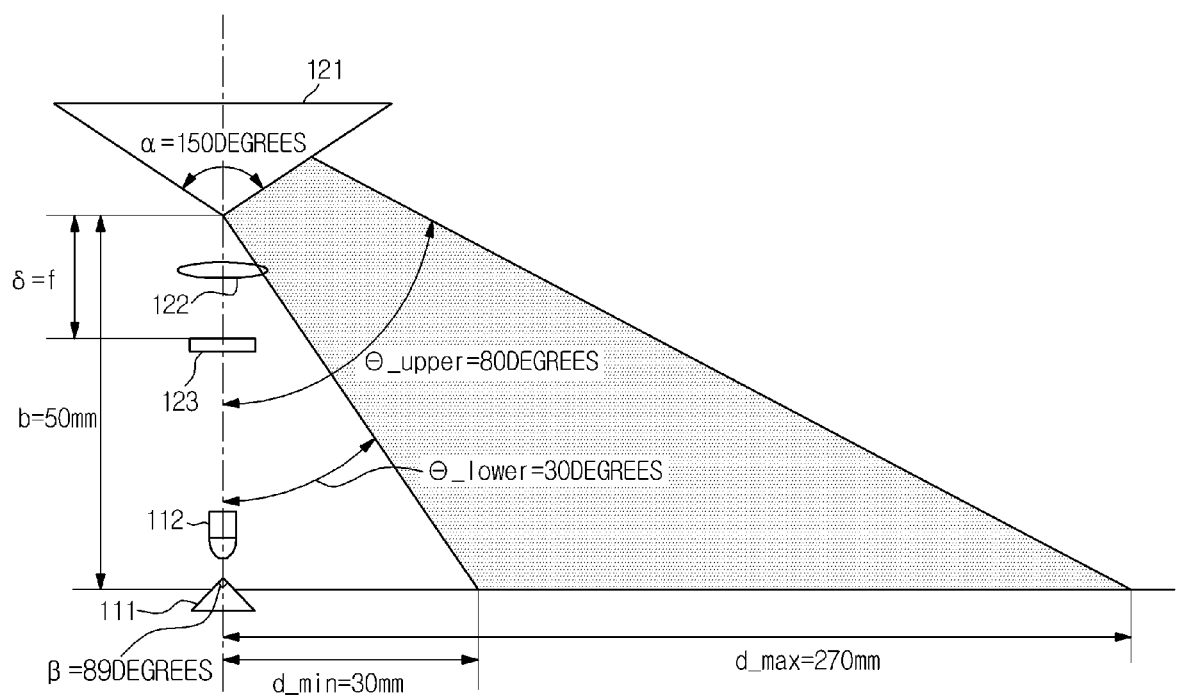
FIG. 5 is a schematic view illustrating an obstacle sensing range in a case in which an angle of the apex of a first conical mirror 111 is set to 89 degrees and an angle of the apex of the second conical mirror 121 is set to 150 degrees.

FIG. 5 is a schematic view illustrating an obstacle sense range in a case in which an angle of the apex of a first conical mirror 111 is set at 89 degrees and an angle of the apex of the second conical mirror 121 is set at 150 degrees.

The elevation angle of line light is determined according to the apex angle of the first conical mirror 111 and an obstacle sense range in up and down directions can be seen. When the apex angle of the first conical mirror 111 is set at 90 degrees, the line light is irradiated in parallel to the ground from the obstacle sensor and an obstacle disposed at the same level as the first conical mirror 111 can be seen.

When line light is irradiated upward as in a case in which the obstacle sensor is mounted on the robot cleaner, it may contact the naked eye of the user. At this time, as shown in FIG. 4, the apex angle of the first conical mirror 111 is adjusted to about 87 to about 89 degrees, which is slightly smaller than 90 degrees, thereby preventing laser beam from directly contacting the naked eye of the user.

The apex angle of the second conical mirror 121 determines the position of the closest obstacle the sensor can sense, that is, a minimum distance to an obstacle that can be sensed (hereinafter, referred to as a "minimum sense distance"). As an apex angle of the second conical mirror 121 increases, minimum sense distance decreases, and as an apex angle is decreased, minimum sense distance is increased.

When the obstacle sensor according to one embodiment of the present disclosure is disposed as shown in FIG. 4, a minimum sense angle ($\theta\_lower$) is obtained in accordance with the following equation 1.

$$\rho = 180 - \theta\_lower \quad \text{[Equation 1]}$$

When the values of variables are substituted in Equation 1 and calculated, assuming that the apex angle ($\rho$) of the second conical mirror 121 is 150 degrees and the distance (b) between the light source and the second conical mirror 121 is 50 mm, the minimum sense angle is 30 degrees in the present embodiment of FIG. 5. Also, the minimum sense distance can be obtained using Equation 2 based on the minimum sense angle.

$$\tan \theta\_lower = d\_min / b \quad \text{[Equation 2]}$$

In this equation, d_min is about 30 mm, since $\theta\_lower$ is 30 degrees and b is 50 mm. That is, the obstacle disposed at the closest distance that can be sensed by the obstacle sensor shown in FIG. 5 is disposed at a point of about 30 mm from the obstacle sensor.

The position of an obstacle that is disposed at the farthest distance the obstacle sensor can sense, that is, a maximum distance from the sensor to the obstacle that can be sensed (hereinafter, referred to as a 'maximum sense distance') is determined by a field of view (FOV) of camera module including the optical lens 122 and the image sensor 123. When a camera module having an FOV of 100 degrees is used in the embodiment shown in FIG. 5, θ_upper is 80 degrees and maximum sense distance (d_max) is 270 mm.

The obstacle sensor according to one embodiment of the present disclosure measures the distance to the obstacle using an image recorded in the image sensor 123 and a resolution is changed depending on the measured distance. Also, the maximum sense distance is changed according to FOV of the camera module and the minimum sense distance is changed depending on the apex angle of the second conical mirror 121. FIGS. 6A-6E are graphs showing distance and resolution measured while changing the apex angle of the second conical mirror 121 and FOV of the lens 122.

Figure 6A:
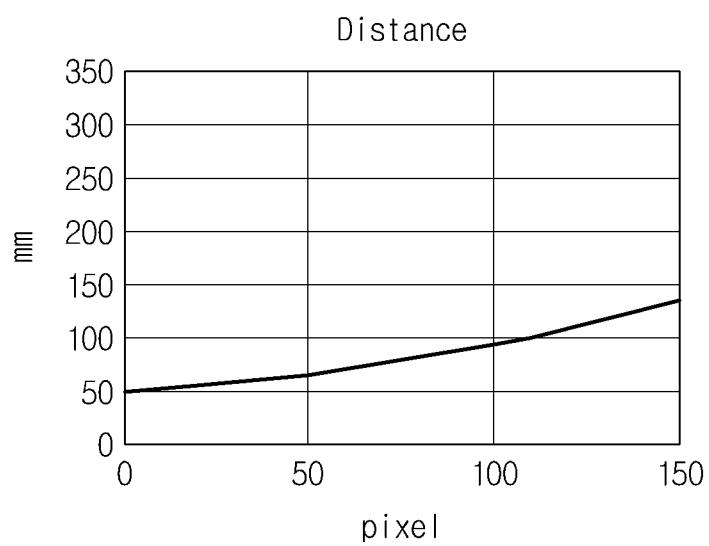
FIGS. 6A to 6E are graphs showing distance and resolution measured while changing the apex angle of the second conical mirror 121 and FOV of the lens 122.
Figure 6B:
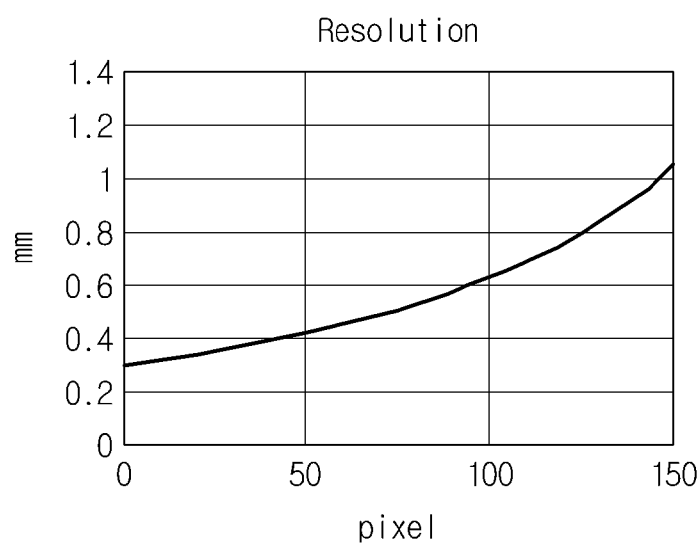

FIG. 6A is a graph showing an obstacle sense distance using the obstacle sensor in which the apex angle of the second conical mirror 121 is 135 degrees, the focal distance of the optical lens 122 is 2.8 mm and FOV of the camera module is 50 degrees. FIG. 6B is a graph showing resolution in the same case as in FIG. 6A.

Figure 6C:
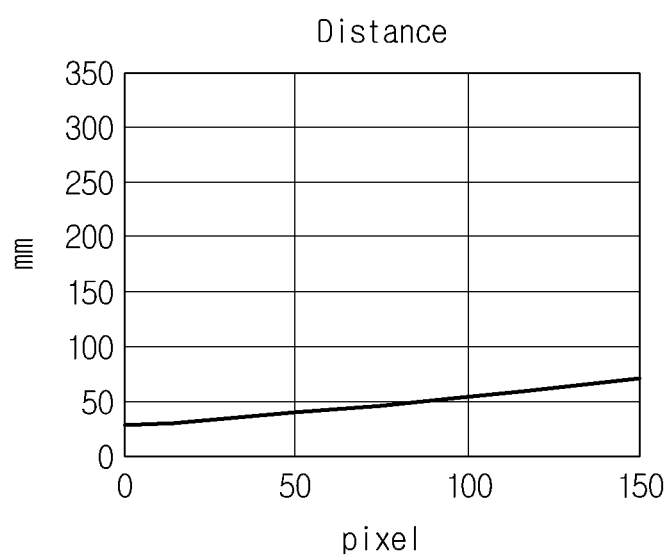
Figure 6D:
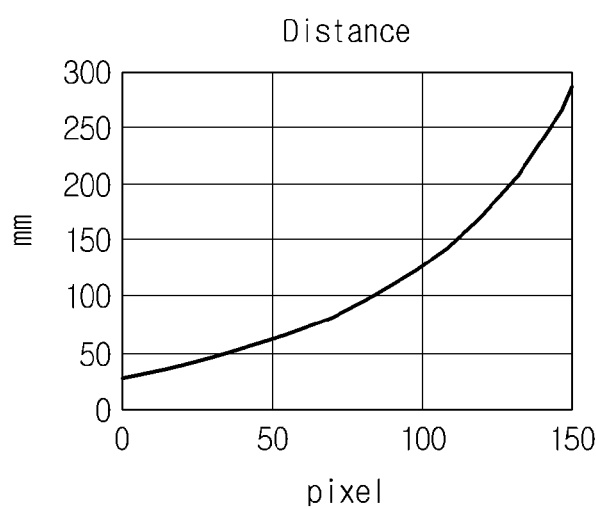
Figure 6E:
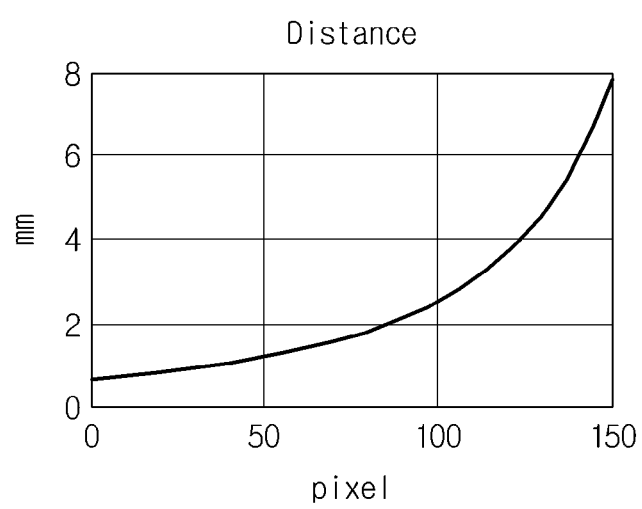

FIG. 6C is a graph showing an obstacle sense distance using the obstacle sensor in which the apex angle of the second conical mirror 121 is 150 degrees, the focal distance of the optical lens 122 is 2.8 mm, and FOV of the camera module is 50 degrees. FIG. 6D is a graph showing an obstacle sense distance using the obstacle sensor in which the apex angle of the second conical mirror 121 is 135 degrees, the focal distance of the optical lens 122 is 2.8 mm, and FOV of the camera module is 100 degrees. FIG. 6E is a graph showing resolution in the same case.

As can be seen from FIGS. 6D and 6E, when an obstacle sensor, in which the apex angle of the second conical mirror 121 is 135 degrees, the focal distance of the optical lens 122 is 2.8 mm, and the FOV of the camera module is 100 degrees, is used, an obstacle distance of 3 cm to 30 cm and a resolution of about 4 mm/pixel on average can be measured. As can be seen from FIGS. 6A to 6C, when only apex angle of the second conical mirror 121 increases under the same conditions, a minimum sense distance is decreased.

As described above, since the sense range of the obstacle is determined by the apex angle of the first and second conical mirrors and FOV of the camera module, the obstacle sensor according to one embodiment of the present disclosure can be used for the desired application by suitably controlling these values.

As described above, an elevation or irradiation angle of line light is changed according to the apex angle of the first conical mirror 111, but the apex angle of the first conical mirror 111 is determined during production of the first conical mirror. Control of elevation angle using the apex angle of the first conical mirror 111 may cause limitations on time and costs. Hereinafter, an embodiment in which an elevation angle at which the line light is irradiated can be changed without changing the apex angle of the first conical mirror 111 will be described.

Figure 7A:
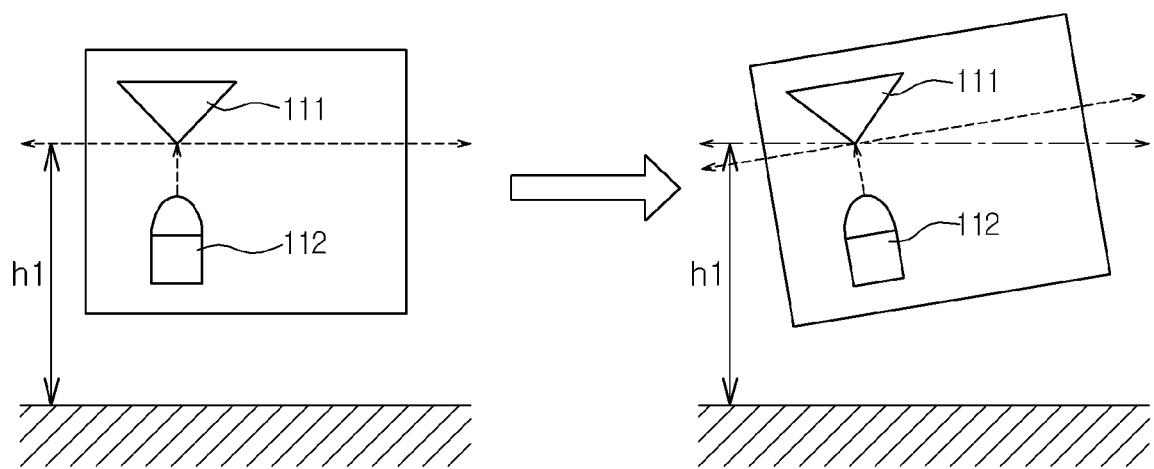
FIGS. 7A and 7B illustrate a structure of a line light irradiating unit capable of controlling an irradiation angle to which line light is irradiated.
Figure 7B:
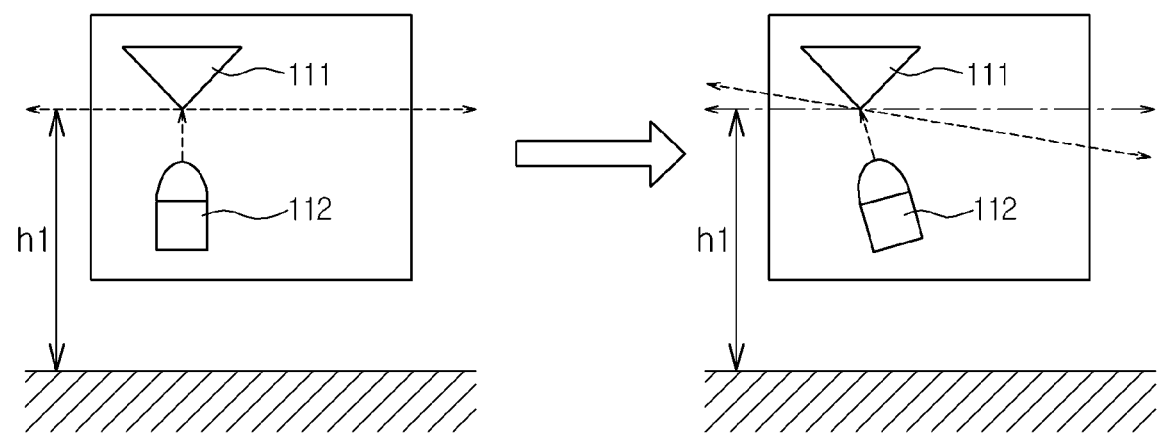

FIGS. 7A and 7B illustrate structures of a line light irradiating unit capable of controlling an elevation angle at which line light is irradiated.

When the line light irradiating unit 110 illustrated in the left of FIG. 7A is used, it is assumed that line light horizontal to the ground is produced and the line light is formed to a height of h1 spaced from the ground. As illustrated in the right of FIG. 7A, when the entire surface of the line light irradiating unit 110 is inclined at a predetermined angle from a horizontal line that is horizontal to the ground, line light inclined at the angle is produced. Accordingly, an obstacle having a height lower than h1 can be sensed in the direction in which the line light irradiating unit 110 is inclined, while an obstacle having a height higher than h1 can be sensed in the opposite direction.

Alternatively, as illustrated in the right of FIG. 7B, when the entire surface of the light-emitting unit 112 is inclined at a predetermined angle from a horizontal line that is horizontal to the ground, line light inclined at the angle is produced. An obstacle having a height higher than h1 can be sensed in the direction in which the light-emitting unit 112 is inclined and an obstacle having a height lower than h1 can be sensed in the opposite direction.

By controlling the angle at which the line light irradiating unit 110 or the light-emitting unit 112 is inclined, an obstacle having the desired height can be sensed.

Figure 8A:
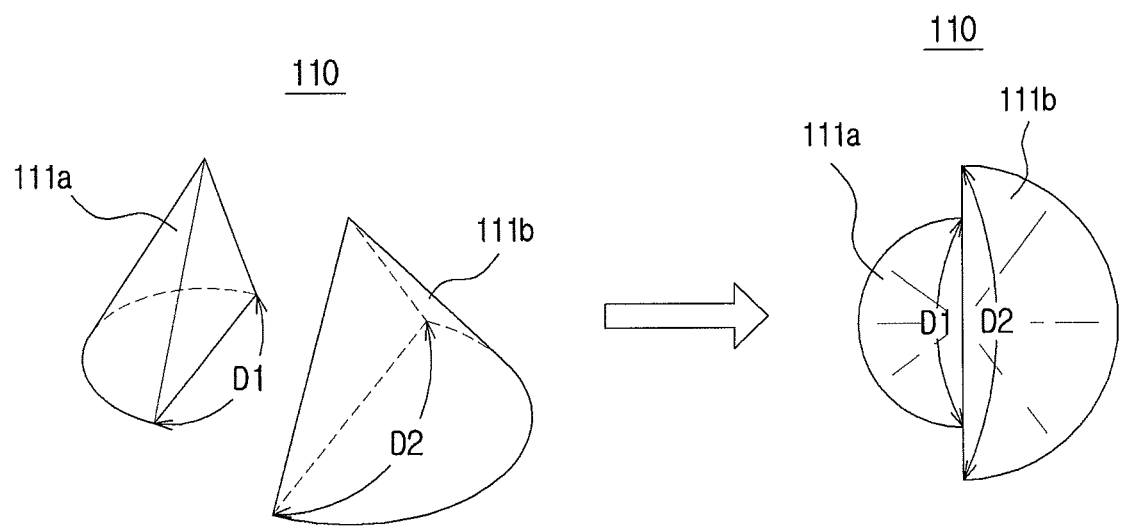
FIGS. 8A and 8B illustrate a structure of the line light irradiating unit to produce line light that is irradiated at a plurality of irradiation angles from one line light irradiating unit.
Figure 8B:
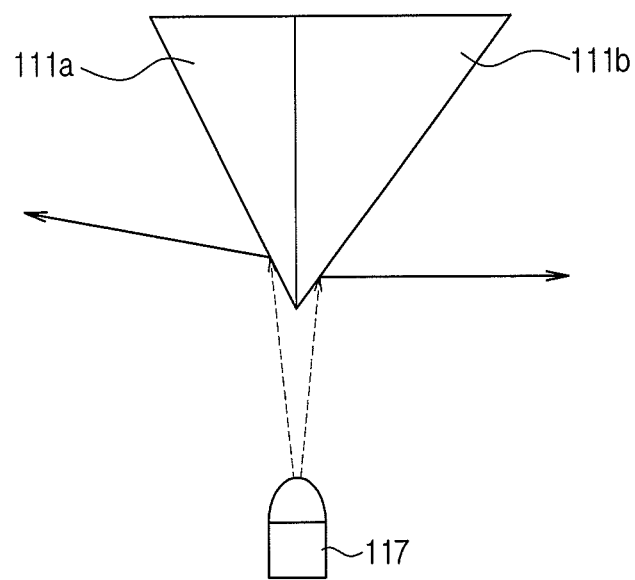

FIGS. 8A and 8B illustrate a structure of a line light irradiating unit to produce line light that is irradiated at a plurality of irradiation angles from one line light irradiating unit.

Referring to FIG. 8A, the first conical mirror 111 includes at least two conical mirror fragments having different diameters. Specifically, in the embodiment shown in FIG. 7A, the first conical mirror 111 has a configuration in which a fragment 111a obtained by halving a conical mirror having a diameter D1 in a vertical direction faces a fragment 111b obtained by halving a conical mirror having a diameter D2 in a vertical direction from each other. The shape of the first conical mirror 111 when viewed from above is shown in the right of FIG. 8A.

The first conical mirror 111 shown in FIG. 8A may be applied to the line light irradiating unit 110, or the first conical mirror 111 may be rotated via a rotator 117 connected thereto, as shown in FIG. 8B.

The rotator 117 is controlled by the obstacle sensing control unit 130 and a control signal transmitted from the obstacle sensing control unit 130 to the rotator 117 may be synchronized with the reflected light receiving unit 120.

Figure 9:
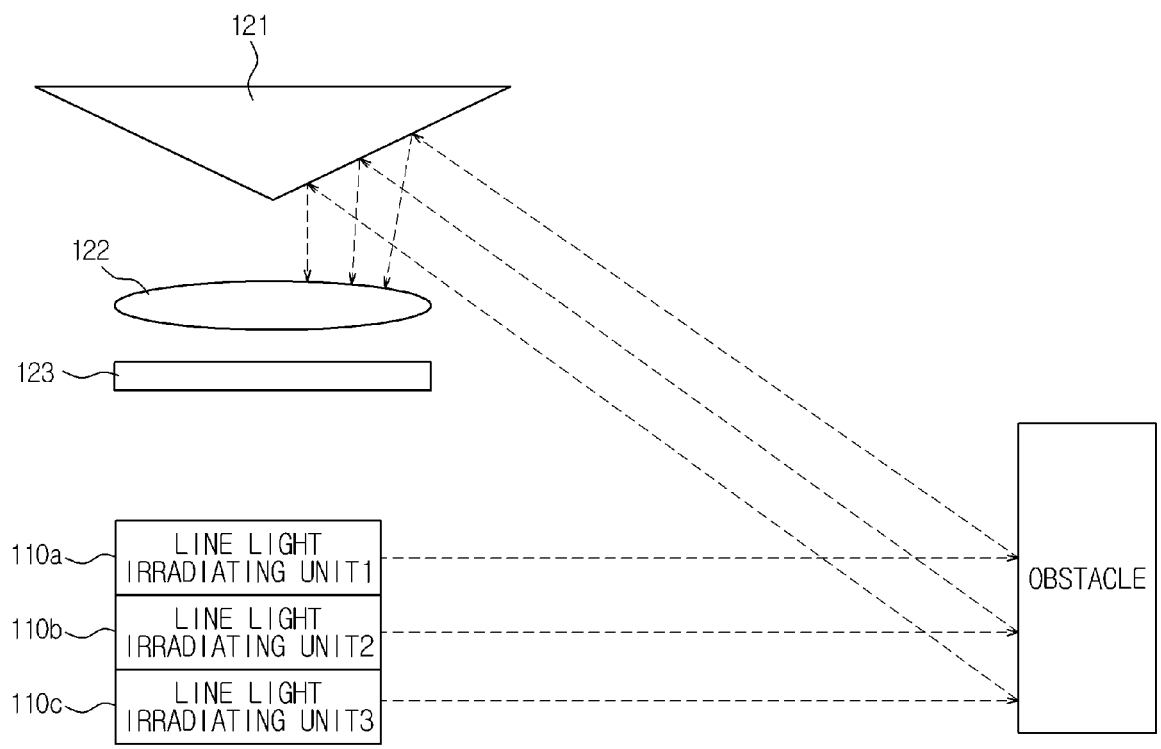
FIG. 9 illustrates a structure of an obstacle sensor capable of sensing obstacles having different heights through a plurality of line light irradiating units.

FIG. 9 illustrates a structure of an obstacle sensor capable of sensing obstacles having different heights through a plurality of line light irradiating units.

Referring to FIG. 9, the obstacle sensor 100 according to one embodiment of the present disclosure may include a plurality of line light irradiating units to irradiate light to different heights. In the present embodiment, the obstacle sensor 100 includes three line light irradiating units, namely, first line light irradiating unit 110a, second line light irradiating unit 110b and third line light irradiating unit 110c.

As shown in FIG. 9, when the first to third line light irradiating units (110a to 110c) are disposed at different heights, the first line light irradiating unit 110a senses an upper part of the obstacle and the third line light irradiating unit 110c senses a lower part of the obstacle, based on the second line light irradiating unit 110b.

Although a case in which the obstacle is higher than the first line light irradiating unit 110a is illustrated in FIG. 9, when the obstacle is lower than the first line light irradiating unit 110a and is higher than the second line light irradiating unit 110b, the reflected light receiving unit 120 receives light emitted from the second line light irradiating unit 110b and the third line light irradiating unit 110c, when the obstacle is lower than the second line light irradiating unit 110b and is higher than the third line light irradiating unit 110c, the reflected light receiving unit 120 receives only light emitted from the third line light irradiating unit 110c.

In order to determine the line light irradiating unit that emits the light received by the reflected light receiving unit 120, light irradiation times of respective line light irradiating units may be different. When the line light irradiating units simultaneously emit light, color of light emitted from respective line light irradiating units may be different.

In the embodiment of FIG. 9, the line light irradiating units are arranged in a row in a vertical line. However, the line light irradiating unit may be independently isolated. Accordingly, the first to third line light irradiating units may be disposed at different horizontal positions. In this case, the height of the optical module can be reduced.

Also, although light is irradiated in parallel to the ground from the line light irradiating unit in the embodiment of FIG. 9, light may be irradiated in a direction inclined at a predetermined angle from a horizontal line by adjusting the apex angle of the first conical mirror of some line light irradiating unit to be larger or smaller than 90 degrees.

Alternatively, as illustrated in FIGS. 7A and 7B, light may be irradiated in a direction inclined at a predetermined angle from a horizontal line by inclining the line light irradiating unit or the light-emitting unit.

Accordingly, although a plurality of line light irradiating units do not have different vertical positions, that is, line light irradiating units are not mounted to different heights, obstacles present at different heights can be sensed by controlling the apex angle of the first conical mirror, or inclining the line light irradiating unit or light-emitting unit.

Figure 10:
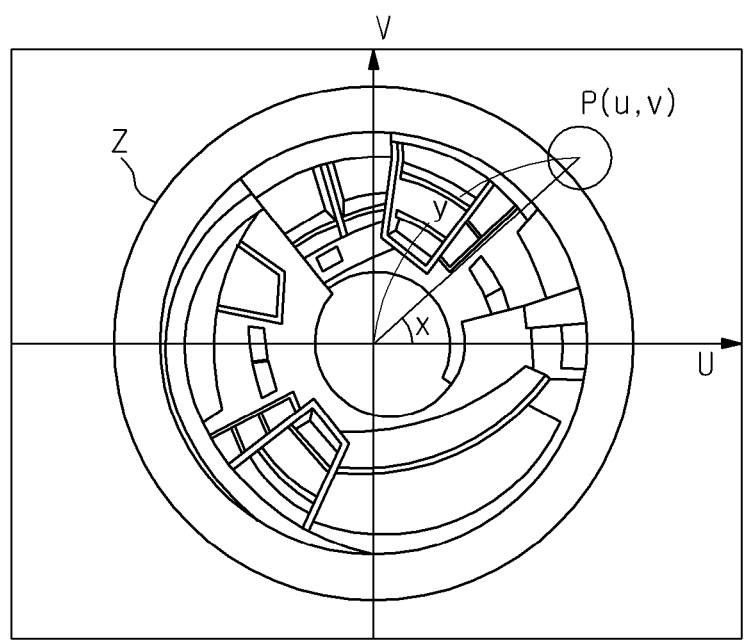
FIG. 10 illustrates image information transmitted from the image processing unit to the sensing control unit 130 according to one embodiment.

FIG. 10 illustrates image information transmitted from the image processing unit to the obstacle sensing control unit 130 according to one embodiment.

Image information may be represented on a two-dimensional image plane. Referring to FIG. 6, assuming that any point is p (u,v), a horizontal axis is an U axis, and a vertical axis is a V axis on the image plane, the angle (x) between point p and the axis U image plane is a direction angle between the obstacle sensor and a specific position corresponding to the point p in an actual three dimensional space, and the distance (y) between the origin and the point p the image plane is a distance between the obstacle and a specific position of the obstacle sensor in an actual three dimensional space.

If an obstacle is not present within a range within which the obstacle sensor can sense, line light irradiated from the line light irradiating unit is infinitely emitted and there is no line light reflected from the obstacle, the line of line light received in an image plane is not observed. However, when an obstacle is present in the identical distance in all angles of the obstacle sensor, a circular image (z) having the radius proportional to the distance is formed. When the distances from the irradiation point of line light corresponding to the angle to the reflection point of the line light are calculated while the angle is varied, and the values corresponding thereto are calculated, information of the distance associated with all direction angles can be obtained.

Calculation of the actual distance between the obstacle sensor and the obstacle will be described in accordance with FIG. 11, [Equation 3], and [Equation 4].

Figure 11:
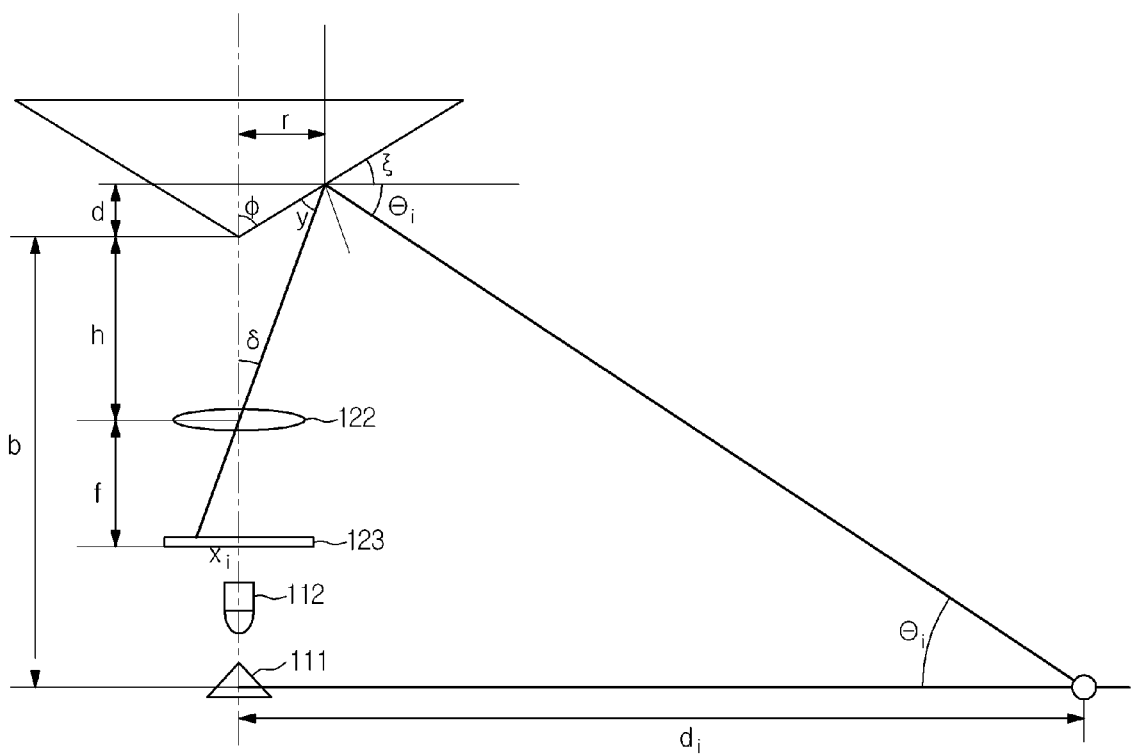
FIG. 11 is a schematic view briefly illustrating a relation between each component of the obstacle sensor and the obstacle for calculation of distance.

FIG. 11 is a schematic view briefly illustrating a relation between each component of the obstacle sensor and the obstacle for calculation of the distance.

First, when the laser reflected by the first conical mirror 111 collides with an obstacle and is then returned back, an angle ($\theta i$) formed by incident light and reflected light will be described in brief in accordance with the following [Equation 3].

$$\theta_i = \gamma - \xi$$
$$\xi = \frac{\pi}{2} - \phi$$
$$\gamma = \phi - \delta$$
$$\delta = \tan^{-1}\left(\frac{x_i}{f}\right)$$
$$\therefore \theta_i = 2\phi - \frac{\pi}{2} - \tan^{-1}\left(\frac{x_i}{f}\right)$$

Also, the distance ($d_i$) between the obstacle sensor and the obstacle can be obtained using $\theta i$ and the following [Equation 4].

$$d_i = r + \frac{(b+d)}{\tan\theta_i}, \qquad [\text{Equation 4}]$$

if $r, d \ll b$, $$d_i \cong \frac{b}{\tan\theta_i}$$

Figure 12:
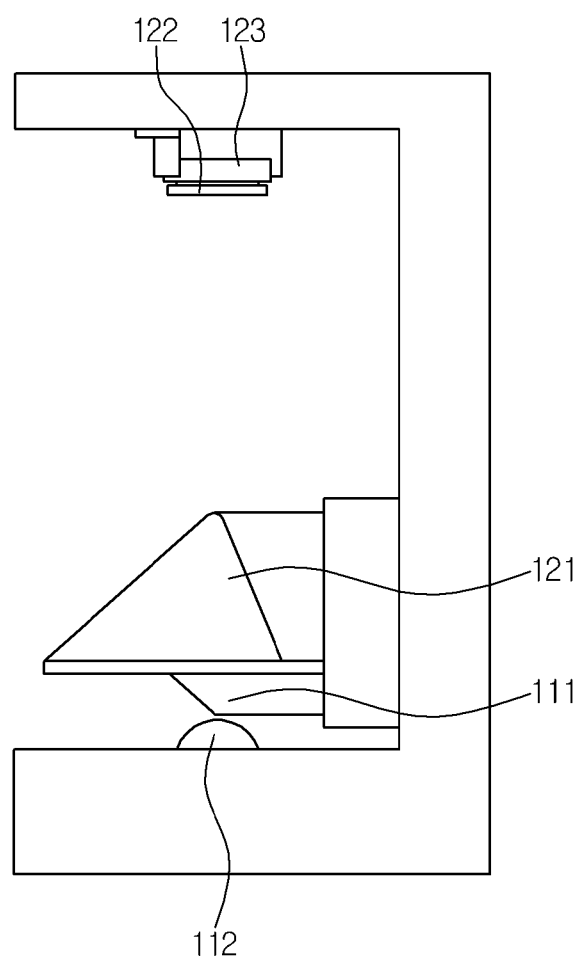
FIG. 12 is a side view illustrating an appearance of an optical module (line light irradiating unit, receiving unit) of the obstacle sensor according to one embodiment of the present disclosure.

Let $\psi = 2\phi - \frac{\pi}{2}$,

FIG. 12 is a side view illustrating an appearance of an optical module (line light irradiating unit, reflected light receiving unit) of the obstacle sensor according to one embodiment of the present disclosure.

The obstacle sensor according to the present embodiment may be provided in a variety of apparatuses that require sensing of the obstacle and measurement of the distance between the sensor and the obstacle, in particular, in a movable robot that can autonomously walk or travel. At this time, the optical module of the obstacle sensor may be mounted into the shape shown in FIG. 12 in the robot, and the size of the optical module can be reduced depending on the size and application of the robot, the positions of the line light irradiating unit 110 and the reflected light receiving unit 120 may be switched, unlike FIG. 12, the apex of the second conical mirror 121 and the apex of the first conical mirror 111 may face each other or face in one direction.

In accordance with the obstacle sensor according to one embodiment of the present disclosure, the line light irradiating unit and the reflected light receiving unit are not arranged in a row in a vertical line to realize reduction of the size of the optical module or the efficiency of obstacle sensing, but may be independently arranged at different positions. A detailed description thereof will be described below.

Also, the obstacle sensor according to one embodiment of the present disclosure is mounted on the robot cleaner that performs cleaning while autonomously traveling to enable the robot cleaner to run without colliding with the obstacle.

Hereinafter, a robot cleaner including an obstacle sensor according to one embodiment of the present disclosure will be described with reference to the drawings.

Figure 13A:
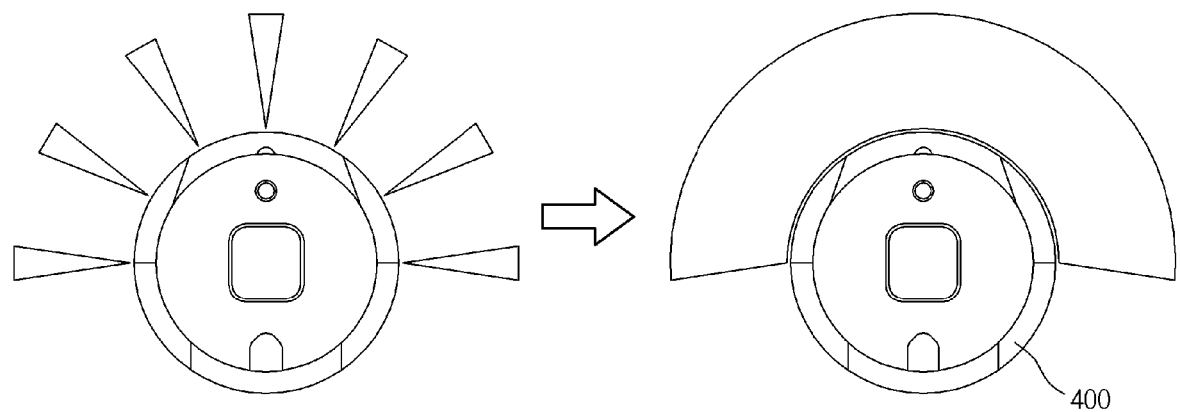
FIG. 13A is a plane view of a robot cleaner 400 according to one embodiment of the present disclosure when seen from above.
Figure 13B:
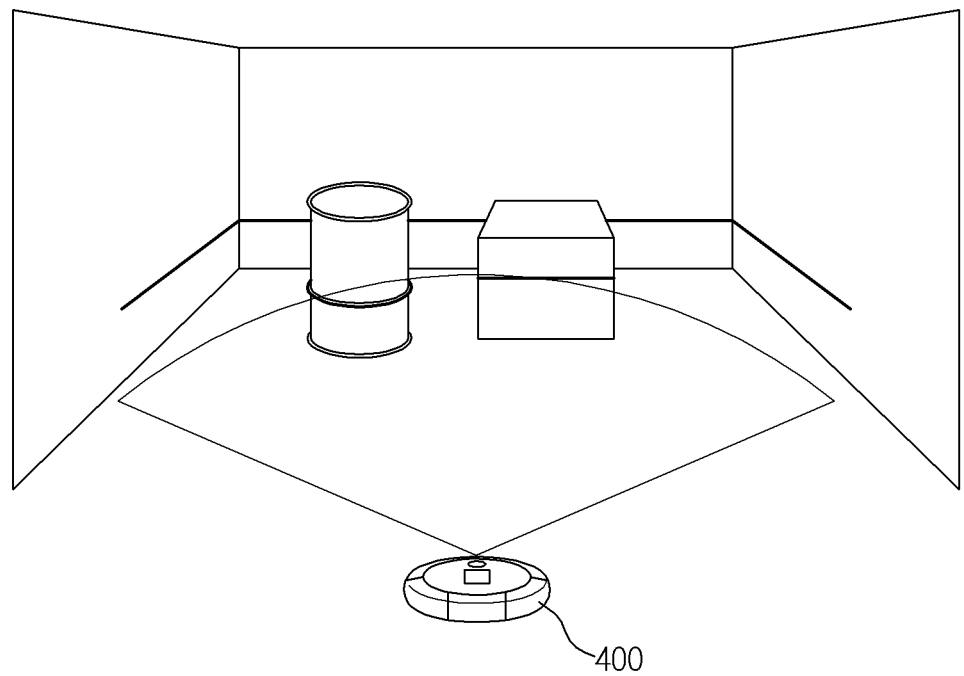
FIG. 13B is a view illustrating a state in which the robot cleaner according to one embodiment of the present disclosure travels.

FIG. 13A is a plan view of a robot cleaner 400 according to one embodiment of the present disclosure when seen from above. FIG. 13B is a view illustrating a state in which the robot cleaner according to one embodiment of the present disclosure travels.

As shown at the left of FIG. 13A, a plurality of sensors should be mounted on the front surface of the robot cleaner to sense obstacles disposed in various directions around the robot cleaner of the related art. As shown at the right of FIG. 13B, the robot cleaner according to one embodiment of the present disclosure 400 is provided at the front surface thereof with the obstacle sensor 100 to irradiate line light in all directions and thereby sense obstacles present in all directions without a plurality of sensors or separate servomotor.

Referring to FIG. 13B, the robot cleaner 400 according to one embodiment of the present disclosure irradiates line light while travelling in the room and senses obstacles present at the position at which the line light is irradiated. At this time, obstacles present at the position lower or higher than the position at which line light is irradiated may not be sensed. Specifically, a dead section is present according to the elevation angle of line light, causing a problem in that obstacles present in lower parts cannot be sensed or upper parts are jammed. As described above, these problems can be solved by disposing a slit between a plurality of ring-shaped grooves having different sizes between the laser diode 112 and the first conical mirror 111.

Figure 14:
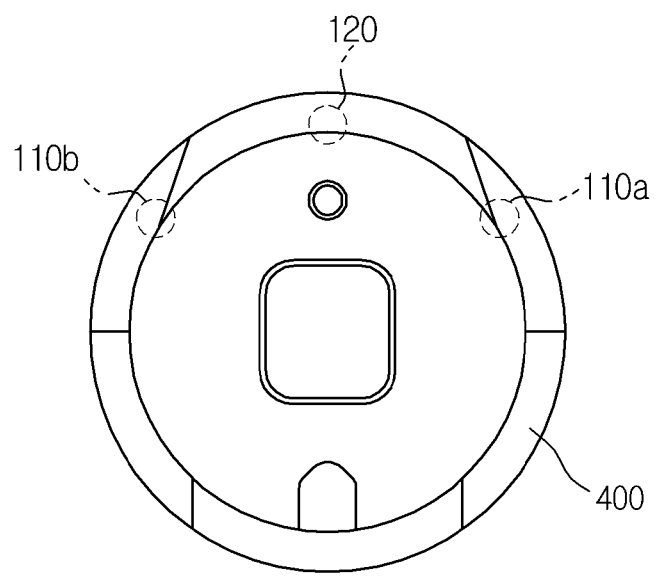
FIG. 14 is a plan view of the robot cleaner 400 in which the line light irradiating unit and the reflected light receiving unit are mounted at different positions, when viewed from above.

FIG. 14 is a plan view of the robot cleaner 400 when viewed from above, in which the line light irradiating unit and the reflected light receiving unit are mounted at different positions.

As described in FIG. 12, the line light irradiating unit 110 and the reflected light receiving unit 120 may be independently disposed at different positions. Referring to FIG. 14, the line light irradiating unit 110 and the reflected light receiving unit 120 may be disposed at different positions in the robot cleaner and may include a plurality of line light irradiating units 110a and 110b. At this time, by disposing the respective line light irradiating units 110a and 110b at different heights, inclining the line light irradiating unit 110, inclining the light-emitting unit or controlling the apex angle of the first conical mirror, obstacles having various heights can be sensed.

As shown in FIG. 14, when the line light irradiating unit 110 and the reflected light receiving unit 120 are not disposed in a row and in one vertical line and are disposed at different positions, obstacles having various heights can be sensed without increasing the height of the optical module.

Figure 15:
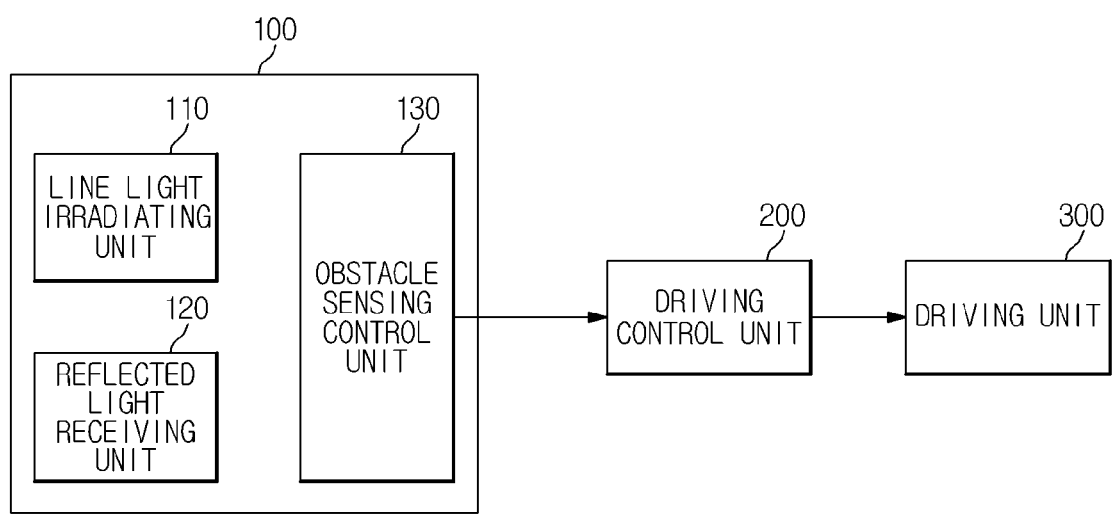
FIG. 15 is a block diagram illustrating a controlled configuration of the robot cleaner 400 according to one embodiment of the present disclosure.

FIG. 15 is a block diagram illustrating a controlled configuration of a robot cleaner 400 according to one embodiment of the present disclosure.

Referring to FIG. 15, the obstacle sensing control unit 130 calculates the position and distance of the obstacle and transmits the values to a driving control unit 200 and the driving control unit 200 determines turning of the direction of the robot cleaner 400, turning direction or stopping of travel, based on the position and distance of the obstacle and transmits driving signals associated therewith to the driving unit 300. Also, the driving unit 300 drives the robot cleaner 400 according to the driving signal.

Also, the slit disposed between the laser diode 112 and the first conical mirror 111 includes a plurality of ring-shaped grooves or a plurality of line light irradiating units 110, as shown in FIG. 13 and thereby extracts the distance from the robot cleaner to the obstacle as well as a height or an approximate shape of the obstacle.

Also, the driving control unit 200 sets a travel path, based on information associated with environments such as distance to and shape of obstacles transmitted from the obstacle sensing control unit 130 and controls the travelling or cleaning operation of the robot cleaner 400 according to the set travel path.

Also, the obstacle sensing control unit 130 judges the state of the robot cleaner based on the information obtained from the reflected light receiving unit 120 and turns on/off the obstacle sensor according to the condition of the robot cleaner.

Specifically, the obstacle sensing control unit 130 analyzes the information obtained from the reflected light receiving unit 120, that is, the image information associated with the environments of the robot cleaner, and thereby judges detachment of the robot cleaner from the sensor window. The robot cleaner is provided with a sensor window to prevent direct emission of light produced in the light-emitting unit and light emitted from the line light irradiating unit 110 is emitted outside via the sensor window.

Figure 16:
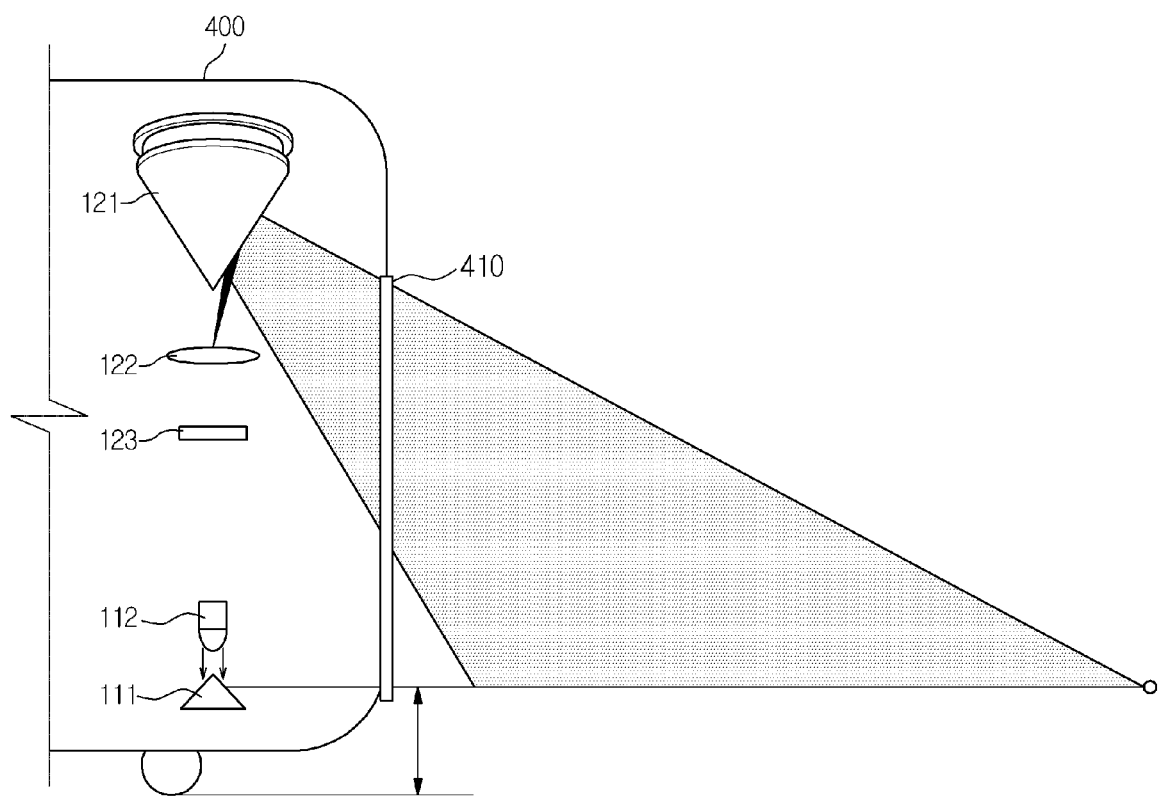
FIG. 16 is a side sectional view illustrating a robot cleaner including a sensor window.

FIG. 16 is a side sectional view illustrating a robot cleaner including a sensor window.

Referring to FIG. 16, a part of light emitted from the line light irradiating unit 110 is reflected from the sensor window 410 and is introduced into the reflected light receiving unit 120. The obstacle sensing control unit 130 analyzes image information transmitted from the reflected light receiving unit 120 and thereby recognizes presence of the sensor window 410. As a result of analysis of image information, when the sensor window 410 is considered to be detached, the obstacle sensing control unit 130 sends a control signal to the light-emitting driving unit 113 to turn the light-emitting unit 112 off.

In another embodiment in which detachment of the sensor window 410 is confirmed, when the sensor window 410 is mounted on the robot cleaner, a sensor window sensing unit such as switch or photo interrupter is mounted in a region which the robot cleaner contacts or is adjacent to the sensor window 410 and the obstacle sensing control unit 130 analyzes a signal output from the sensor window sensing unit and thereby confirms detachment of the sensor window.

Referring to FIG. 15, the obstacle sensing control unit 130 recognizes a state in which the robot cleaner 400 is lifted from the ground and thereby turns the light-emitting unit off. The robot cleaner 400 is provided with a variety of devices such as an acceleration sensor, gyro sensor, vision sensor (or camera) to sense the state of the robot cleaner 400. The obstacle sensing control unit 130 analyzes signals output from these devices and thereby determines whether the robot cleaner is lifted from the ground.

For example, whether the robot cleaner is lifted from the ground can be determined by obtaining upper part image information of the robot cleaner obtained from the vision sensor and analyzing the obtained image information. Specifically, when the distance to the ceiling obtained by setting based on the distance between the robot cleaner laid on the ground and the ceiling and calculating image information obtained from the vision sensor is lower than a predetermined level, the robot cleaner is considered to be lifted from the ground.

Alternatively, variation in the distance to the ceiling can be sensed by mounting an ultrasonic sensor or the like to sense objects present in the ceiling direction on the top of the robot cleaner, or longitudinal acceleration can be sensed by mounting a longitudinal acceleration sensor, thereby judging the state in which the robot cleaner is lifted from the ground.

Alternatively, by analyzing image information obtained from the reflected light receiving unit 120, the state in which the robot cleaner is lifted from the ground can be judged.

Also, the obstacle sensing control unit 130 transmits a control signal to the light-emitting driving unit 113 after the robot cleaner begins to travel and thereby turns the light-emitting unit 112 on and the obstacle sensing control unit 130 turns the light-emitting unit 112 off after the robot cleaner finishes travel, thereby reducing power consumption and preventing unnecessary emission of the light source.

Figure 17:
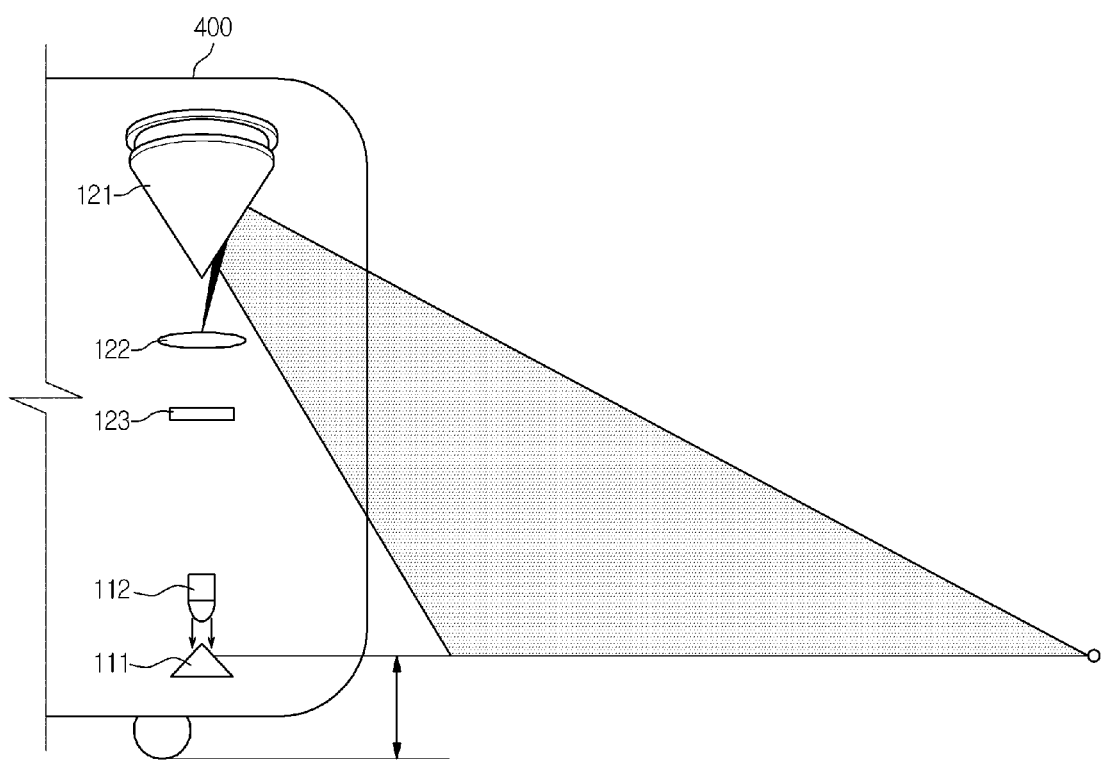
FIG. 17 is a side sectional view illustrating a configuration of an obstacle sensor mounted in front of a robot cleaner according to one embodiment of the present disclosure 400.

FIG. 17 is a side sectional view schematically illustrating a configuration of an obstacle sensor mounted in front of a robot cleaner according to one embodiment of the present disclosure 400.

Referring to FIG. 17, the obstacle sensor 100 is mounted in a travel direction of the robot cleaner 400, that is, on the front surface thereof. The positions of the line light irradiating unit 110 and the reflected light receiving unit 120 may be changed up and down. However, when the line light irradiating unit 110 is mounted on the bottom of the robot cleaner 400, an obstacle interfering travel of the robot cleaner 400 can be easily sensed.

Also, by disposing the first conical mirror 111 such that the first conical mirror 111 is spaced from the ground by a predetermined distance or more, the running robot cleaner 400 can be controlled to ignore an obstacle having a height that the travelling robot cleaner 400 can pass under. In one embodiment, when the position of the first conical mirror 111 is controlled so that the laser reflected from the first conical mirror 111 is irradiated to a height of 20 mm from the ground, the robot cleaner 400 passes over an obstacle having a height less than 20 mm without sensing the obstacle.

However, FIG. 17 shows a structure in which the obstacle sensor 100 is mounted on the robot cleaner according to one embodiment. In one embodiment, light may be irradiated in a vertical direction to the ground by inclining the obstacle sensor at 90 degrees, as desired.

Figure 18:
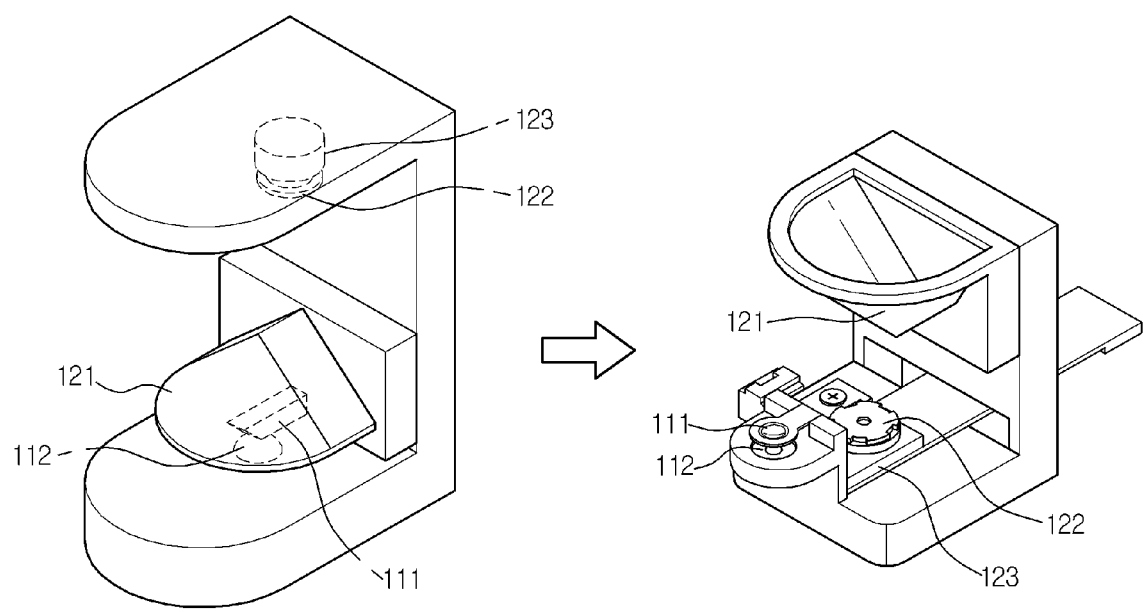
FIG. 18 is a view illustrating a configuration of a sensor module of an obstacle sensor mounted on the robot cleaner 400 according to one embodiment of the present disclosure.

FIG. 18 is a view illustrating a configuration in which an optical module of an obstacle sensor is mounted on the robot cleaner 400 according to one embodiment of the present disclosure.

As described above, the positions of the line light irradiating unit 110 and the reflected light receiving unit 120 are not limited. As shown in FIG. 18, the apex of the first conical mirror 111 of the line light irradiating unit 110 may be disposed downward and the apex of the second conical mirror 121 of the reflected light receiving unit 120 may be disposed upward. As shown in FIG. 18, when the line light irradiating unit 110 and the reflected light receiving unit are disposed, the image sensor 123 is disposed down from the top to prevent direct irradiation of external light to the image sensor 123.

When the obstacle sensor is mounted on the robot cleaner 400, it is important to minimize the size of the obstacle sensor. Accordingly, in another embodiment of the present disclosure, as shown in the right of FIG. 18, the line light irradiating unit 110 and the reflected light receiving unit are not arranged in up and down directions and are separately disposed in front of the line light irradiating unit 110, thereby reducing the height of the obstacle sensor.

Also, as shown in FIG. 14, by disposing the line light irradiating unit 110 and the reflected light receiving unit at independent positions, the size of the obstacle sensor can be reduced.

As described above, in accordance with the obstacle sensor according to one embodiment of the present disclosure, the obstacle sensor uniformly generates line light, thereby sensing obstacles present in all directions, reducing an obstacle sensing dead section according to an elevation angle and extracting the shape of an obstacle.

Also, the robot cleaner 400 including the obstacle sensor according to the present disclosure senses obstacles present in all directions and uses the obstacle sensor for driving control, thereby realizing more efficient cleaning and running.

When the obstacle sensor according to embodiments of the present disclosure is used, it is possible to form uniform line light, improve accuracy of obstacle sensing, sense obstacles present in all directions using the line light, eliminate the necessity of mounting a plurality of sensors or separate servomechanisms and thus improve economical and structure efficiency.

Also, the robot cleaner including the obstacle sensor is capable of accurately sensing obstacles present in all directions, thereby efficiently traveling.

Also, the robot cleaner including the obstacle sensor is capable of efficiently controlling the obstacle sensor according to the state of the robot cleaner.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An obstacle sensor comprising: a line light irradiating unit comprising a light-emitting unit, and a first conical mirror, an apex of which is disposed towards the light-emitting unit in a light irradiation direction of the light-emitting unit and which converts light emitted from the light-emitting unit into line light irradiated in all directions; and a reflected light receiving unit comprising a second conical mirror to condense light, that is irradiated from the first conical mirror and is then reflected from an obstacle, a lens, that is spaced from the apex of the second conical mirror by a predetermined distance and transmits the reflected light, and an imaging unit to image the reflected light that passes through the lens, wherein the line light irradiating unit and the reflected light receiving unit are arranged in a row in a vertical line or are arranged at different positions in a vertical line or horizontal line, and wherein the first conical mirror is formed by joining two or more conical fragments having different bottom diameters.

2. The obstacle sensor according to claim 1, wherein the line light irradiating unit further comprises:
a slit or an axicon lens disposed between the light-emitting unit and the first conical mirror to form light irradiated from the light-emitting unit in the form of a ring.

3. The obstacle sensor according to claim 1, wherein the line light irradiating unit further comprises:
a slit having at least one groove disposed between the light-emitting unit and the first conical mirror.

4. The obstacle sensor according to claim 3, wherein the slit has a groove having a ring, cross (+), circular or linear (−) shape.

5. The obstacle sensor according to claim 1, further comprising:
a rotator to rotate the first conical mirror.

6. The obstacle sensor according to claim 1, wherein an angle of two sides formed on the apex on the vertical cross-section of the first conical mirror is about 88 to about 90 degrees.

7. The obstacle sensor according to claim 1, wherein the lens of the reflected light receiving unit is spaced from the apex of the second conical mirror by a focal distance of the lens.

8. The obstacle sensor according to claim 1, wherein the surface of lens or the second conical mirror of the reflected light receiving unit is coated with a band pass filter to transmit only wavelength of the reflected light.

9. The obstacle sensor according to claim 1, wherein the apex of the first conical mirror of the line light irradiating unit and the apex of the second conical mirror of the reflected light receiving unit are disposed in opposite directions.

10. The obstacle sensor according to claim 1, wherein the apex of the first conical mirror of the line light irradiating unit and the apex of the second conical mirror of the reflected light receiving unit are disposed in one direction.

11. The obstacle sensor according to claim 9, wherein the apex of the first conical mirror of the line light irradiating unit and the apex of the second conical mirror of the reflected light receiving unit face each other.

12. The obstacle sensor according to claim 1, wherein the lens of the reflected light receiving unit is a wide-angle lens.

13. The obstacle sensor according to claim 1, further comprising:
   a structure having a hole smaller than an irradiation cross-section area of light irradiated from the light-emitting unit,
   wherein the hole is disposed between the light-emitting unit and the first conical mirror in a light irradiation path of the light-emitting unit.

14. The obstacle sensor according to claim 1, wherein the line light irradiating unit or the light-emitting unit is inclined at a predetermined angle from a perpendicular line that is vertical to the ground.

15. The obstacle sensor according to claim 1, further comprising:
   an obstacle sensing control unit to analyze an image recorded on the imaging unit and thereby extract the distance or shape of the obstacle.

16. The obstacle sensor according to claim 15, wherein the line light irradiating unit is provided in plural at different heights from the ground and the obstacle sensing control unit analyzes an image recorded on the imaging unit and determines a height of the obstacle.

17. A robot cleaner comprising an obstacle sensor to sense obstacles and a driving control unit to control driving based on the sensing results of the obstacle sensor,
   wherein the obstacle sensor comprises:
   a line light irradiating unit comprising a light-emitting unit, a light-emitting driving unit to drive the light-emitting unit, and a first conical mirror, an apex of which is disposed towards the light-emitting unit in a light irradiation direction of the light-emitting unit and which converts light emitted from the light-emitting unit into line light irradiated in all directions; and
   a reflected light receiving unit comprising a second conical mirror to condense light, that is irradiated from the first conical mirror and is then reflected from an obstacle, a lens, that is spaced from the apex of the second conical mirror by a predetermined distance and transmits the reflected light, an imaging unit to image the reflected light that passes through the lens, and an image processing unit to process the image obtained in the imaging unit; and
   an obstacle sensing control unit to analyze the image recorded in the imaging unit and thereby extract the distance or shape of the obstacle,
   wherein the line light irradiating unit and the reflected light receiving unit are arranged in a row in a vertical line or are arranged at different positions in a vertical line or horizontal line, and
   wherein the first conical mirror is formed by joining two or more conical fragments having different bottom diameters.

18. The robot cleaner according to claim 17, wherein the apex of the first conical mirror of the line light irradiating unit and the apex of the second conical mirror of the reflected light receiving unit are disposed in the opposite directions.

19. The robot cleaner according to claim 17, wherein the line light irradiating unit is mounted on the bottom of the front surface of the robot cleaner and the reflected light receiving unit is mounted on the top of the front surface of the robot cleaner.

20. The robot cleaner according to claim 17, wherein the driving control unit receives a shape or distance of the obstacle from the obstacle sensor and determines a travel path based on the shape or distance of the obstacle.

21. The robot cleaner according to claim 17, wherein the line light irradiating unit is provided in plural at different heights from the ground and the obstacle sensing control unit analyzes an image recorded on the imaging unit and thereby determines a height of the obstacle.

22. The robot cleaner according to claim 17, wherein the obstacle sensing control unit transmits a control signal to the light-emitting driving unit to turn the light-emitting unit off, when the obstacle sensing control unit determines that the robot cleaner is lift from the ground.

23. The robot cleaner according to claim 17, wherein the obstacle sensing control unit transmits a control signal to the light-emitting driving unit to turn the light-emitting unit off, when the obstacle sensing control unit determines that a sensor window of the robot cleaner is detached.

24. The robot cleaner according to claim 17, further comprising:
   a switch or a photo-interrupter adjacent to the sensor window,
   wherein the obstacle sensing control unit analyzes a signal output from the switch or the photo interrupter and thereby determines detachment of the sensor window.

25. The robot cleaner according to claim 17, wherein the obstacle sensing control unit turns the light-emitting unit on, when the robot cleaner begins to travel, and turns the light-emitting unit off, when the robot cleaner finishes travel.

* * * * *